United States Patent
Bent et al.

(10) Patent No.: US 7,519,969 B2
(45) Date of Patent: *Apr. 14, 2009

(54) SYSTEM AND METHOD FOR CONTROLLING USER INTERFACE PROPERTIES WITH DATA

(75) Inventors: Samuel W. Bent, Bellevue, WA (US); Namita Gupta, Kirkland, WA (US); David J. Jenni, Sammamish, WA (US); Alexander I. Hopmann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1054 days.

This patent is subject to a terminal disclaimer.

(21) Appl. No.: 10/692,316

(22) Filed: Oct. 23, 2003

(65) Prior Publication Data

US 2004/0230911 A1    Nov. 18, 2004

Related U.S. Application Data

(63) Continuation-in-part of application No. 10/440,081, filed on May 17, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. ............ 719/315; 719/320; 715/762; 717/108; 717/116

(58) Field of Classification Search ............. 715/700, 715/701, 762–773; 717/100–123, 162–167; 719/310–320, 328–332

See application file for complete search history.

(56) References Cited

U.S. PATENT DOCUMENTS

| | | | | |
|---|---|---|---|---|
| 5,555,365 | A | * | 9/1996 | Selby et al. ............... 715/765 |
| 6,023,271 | A | * | 2/2000 | Quaeler-Bock et al. ..... 715/866 |
| 6,378,004 | B1 | | 4/2002 | Galloway et al. ............ 709/321 |
| 6,429,880 | B2 | * | 8/2002 | Marcos et al. ............. 715/744 |
| 6,438,618 | B1 | | 8/2002 | Lortz et al. ................ 709/318 |
| 6,978,422 | B1 | * | 12/2005 | Bushe et al. ............... 715/734 |
| 6,983,421 | B1 | * | 1/2006 | Lahti et al. ................ 715/763 |
| 7,039,875 | B2 | * | 5/2006 | Khalfay et al. ............. 715/762 |
| 7,194,743 | B2 | * | 3/2007 | Hayton et al. .............. 719/315 |

OTHER PUBLICATIONS

Gamma et al, Design Patterns CD, Addison-Wesley, 1997, Preface to CD, pp. 1-2 and Abstract Factory; pp. 1-9.*
W3C, XML Path Language (XPath) Version 1.0, W3C, 1999, pp. 1-44.*

* cited by examiner

*Primary Examiner*—Meng-Ai An
*Assistant Examiner*—Diem K Cao
(74) *Attorney, Agent, or Firm*—Merchant & Gould, P.C.

(57) ABSTRACT

Described is a system and method for controlling user interface (UI) properties with data. An application is separated into independent parts, a logic portion and a UI portion. The logic portion manipulates data values within the application. The UI portion is responsible for displaying UI properties. A binding specification describes a relationship between the UI property and the data value. The binding specification is used by system level code to determine the manner in which it is notified when the data value undergoes a change and the manner in which it directs the UI portion to reflect the change in the UI property. The binding specification identifies a source data item, a path to the data value in the source data item, a target UI element, and the UI property on the target UI element. The binding may be specified using code or markup language.

66 Claims, 4 Drawing Sheets

US 7,519,969 B2

SYSTEM AND METHOD FOR CONTROLLING USER INTERFACE PROPERTIES WITH DATA

RELATED APPLICATIONS

This utility patent application claims the benefit under 35 United States Code § 119(e) of U.S. patent application Ser. No. 10/440,081 filed on May 17, 2003.

BACKGROUND OF THE INVENTION

The manner in which information is presented to users affects the user's ability to understand and comprehend the information. On computer displays, it has become a standard practice to add emphasis to information by using color, font styles, and the like. This emphasis allows users to more readily grasp the importance of the information. The code handling the presentation of the information (user interface) and the code performing the application logic on the information are typically closely coupled. For example, the logic assigns user interface properties (e.g., color, font, position, size) directly with data. Thus, when there is a change to the user interface, the logic must typically also change. For example, in the case of a text box, the user interface code listens to determine whether text has changed, upon a change, the user interface code validates the changed text and then displays the changed text. This tightly coupled nature of the user-interface and the logic results in very fragile code. Maintaining this fragile code is very costly and time consuming.

SUMMARY OF THE INVENTION

The present invention is directed at a system and method for controlling the user interface with data. The invention decouples the user interface and the data, along with its application logic, by providing a mechanism for associating data to the user interface. The invention enables user interface designers and application authors who write the application logic to work independently. Neither the designers nor the authors need to understand the other's code or will impact the other's code development. This invention also allows changes to the user interface to be done quite easily. For example, when new and more user-appealing user interface platforms become available or when the user interface designer wishes to change the look of the application, the designer does not need to change the application logic. In addition, the mechanism for associating data to the user interface is dynamic. This allows any changes in the data to be automatically reflected in the presentation. In addition, any input from a user via the user interface can be automatically update the data. Because the present invention allows association of not only data display aspects of the user interface (e.g., text), but also visual aspects (e.g., background, font size, and the like), descriptive, visually enhancing and flexible presentation of data can be provided. For example, negative numbers may be displayed in red or an arrow may appear pointing upwards when stock prices are increasing.

Thus, in accordance with the present invention, an application is separated into independent parts, a logic portion and a UI portion. The logic portion manipulates data values within the application. The UI portion is responsible for the presentation of the data. A binding specification describes a relationship between the UI property and the data value. The binding specification is used by system level code to determine the manner in which it is notified when the data value undergoes a change and the manner in which it directs the UI portion to reflect the change in the UI property. The binding specification identifies a source data item, a path to the data value in the source data item, a target UI element, and the UI property on the target UI element. The binding may be specified using code or markup language.

DETAILED DESCRIPTION OF THE PREFERRED EMBODIMENT

The present invention is directed at a system and method for controlling the user interface with data. The invention decouples the user interface and the application logic by providing a mechanism for associating the data with the user interface. As will be described in detail below, this decoupling of the user interface and the data, along with its associated logic, allows different groups of developers to work independently on both the user interface and the logic without impacting the code development of the other group. In addition, described in detail below, the present invention provides a system and mechanism for automatically transferring values from data sources to the user interface and vice versa. Throughout the following discussion, the term "databinding" refers to the process of associating data values with UI properties, transferring and updating the data values, and the like.

Illustrative Computing Environment

Figure 1:
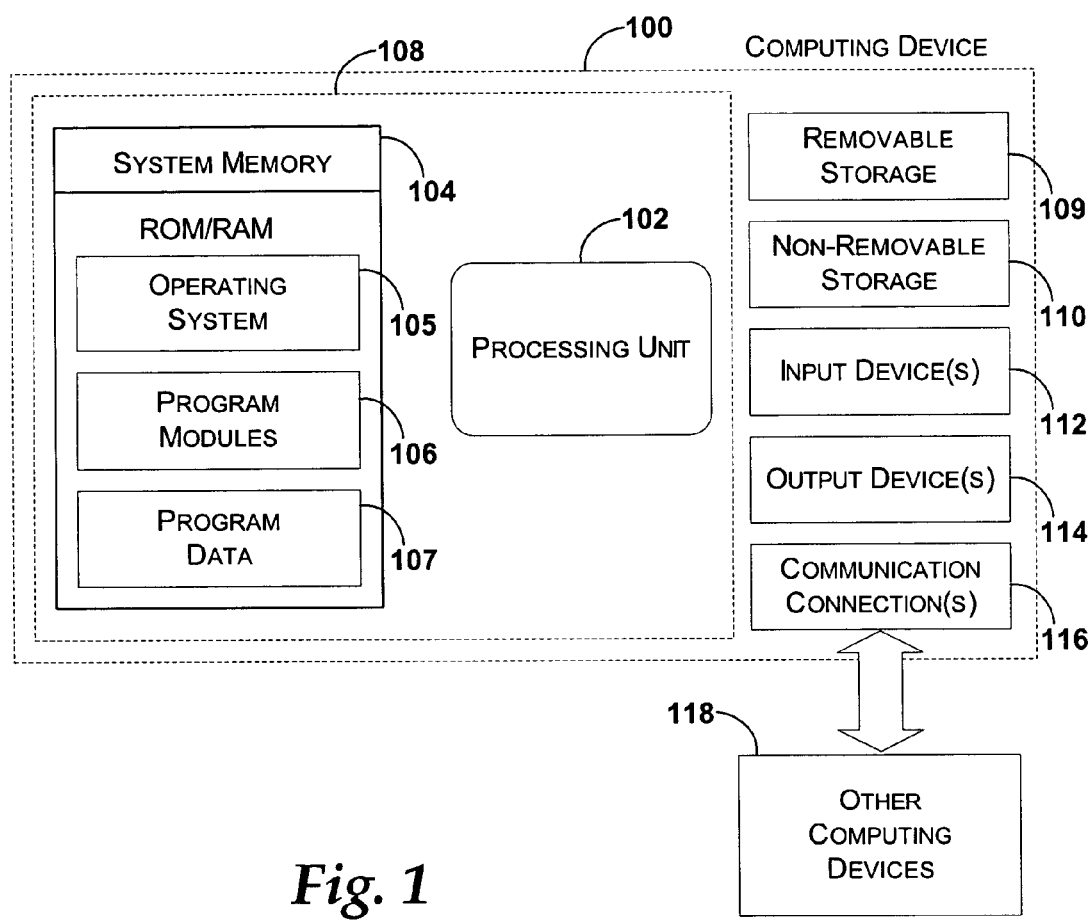
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device 100 to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
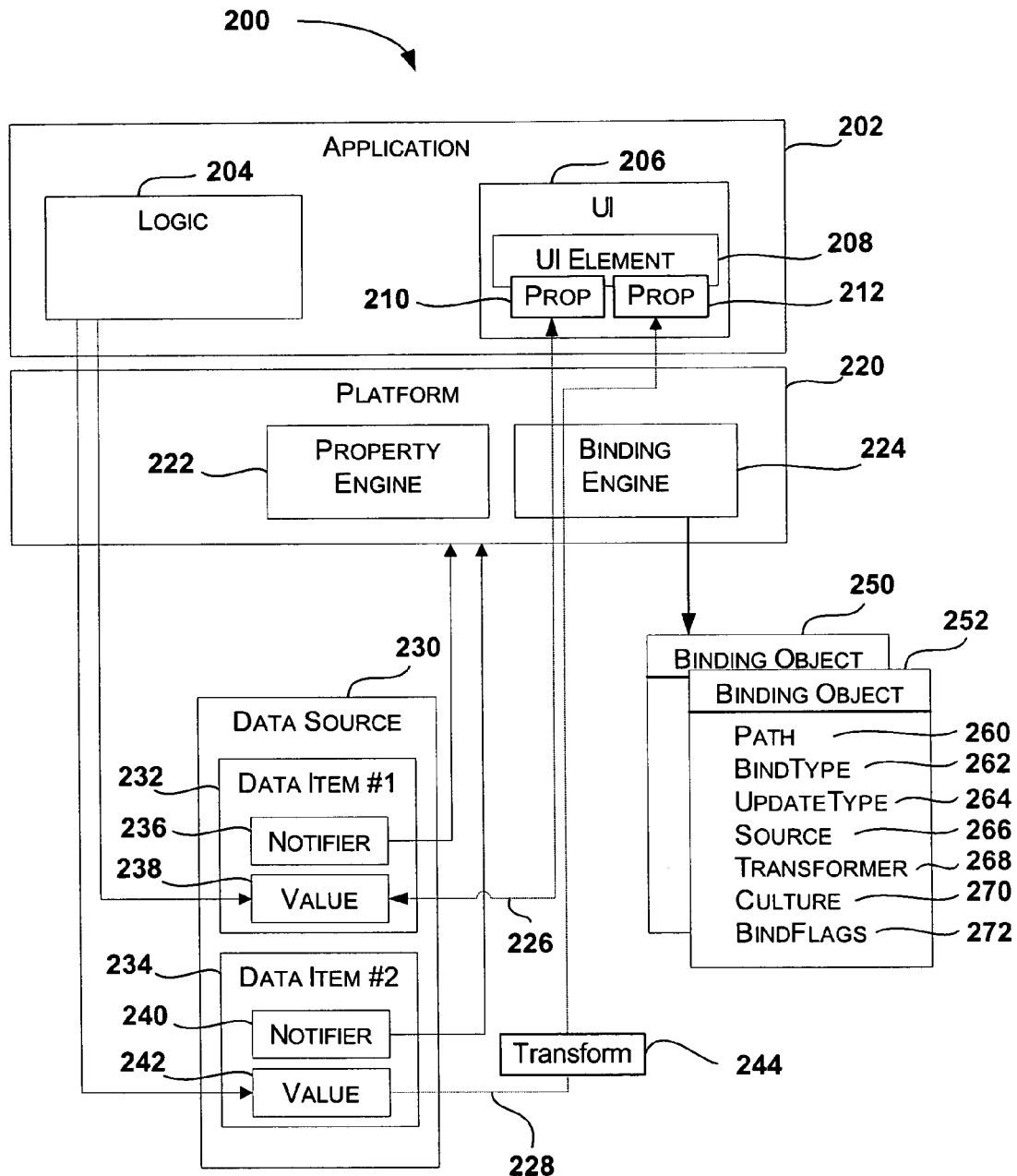
FIG. 2 is a functional block diagram illustrating one embodiment for controlling user interface properties with data in accordance with the present invention.

FIG. 2 is a functional block diagram illustrating one embodiment of a system 200 for controlling user interface properties with data in accordance with the present invention. The system 200 includes an application 202, a platform 220, and a data source 230. Application 202 may be one of applications 106 on computing device 100 shown in FIG. 1. The application 202 includes code (hereinafter referred to as logic 204) for manipulating a data value (e.g., source data value 238). In general, the logic 204 performs validation on data values and updates the data values. Data value (e.g., data value 238) represents the content of a property (i.e., a data source property) of a data item (e.g., data item 232). The data item 232 is located within a data source (e.g., data source 230). Each data source 230 may include several data items, each data item has one or more properties, in which the source data value is stored. Logic 204 may manipulate data values from multiple data sources. The data sources may include an XML document, an object, a dataset, and the like. As will be described in greater detail below, each property of the data item may be used to control the user interface (UI).

The application 202 also includes code (hereinafter referred to as user interface 206) for presenting information. The user interface 206 includes several user interface elements (e.g., user interface element 208). Each user interface element 208 includes one or more properties (e.g., UI properties 210 and 212), such as for displayed text, color, font, position, size, and the like. Then, as described in detail later, these UI properties 210 and 212 are associated with one or more of the data values 238 and 242 in accordance with the present invention. In general, the association occurs via a binding engine 224 within the platform 220. The platform 220 represents a system layer of services, such as an operating system, a virtual engine, and the like. The platform 220 also includes a property engine 222 that is responsible for maintaining hierarchical information pertaining to the data values 234 and 242 and for updating the associated properties with data values. Even though binding engine 224 and property engine 222 are shown as separate components, one skilled in the art will appreciate that the functionality provided by each may be included within one component without departing from the present invention.

The association (i.e, bindings) of the data values 238 and 242 to their UI properties 210 and 212 is represented in FIG. 2 by dashed lines from the data value to the UI property (hereinafter referred to as bindings 226 and 228). During the following discussion, the term "data value" may be used interchangeably with the term "source data value". Similarly, the term UI property may be used interchangeably with the term "target property". These bindings 226 and 228 allow dynamic properties (i.e., target properties) to be automatically set from data values (i.e., source data values), such as from properties of arbitrary objects. These bindings may be dynamic so that the bound target property automatically updates to reflect changes in the source data value.

In order to provide this automatic updating capability, the present invention further provides a notification mechanism (e.g., represented in FIG. 2 by notifiers 236 and 240 and arrows from the notifiers to platform 220). Each data item 232 and 234 has a corresponding notifier 236 and 240, respectively. The notification mechanism is responsible for informing the system that the source data value has changed and that the data value can be propagated to the target property (i.e., UI property).

Figure 4:
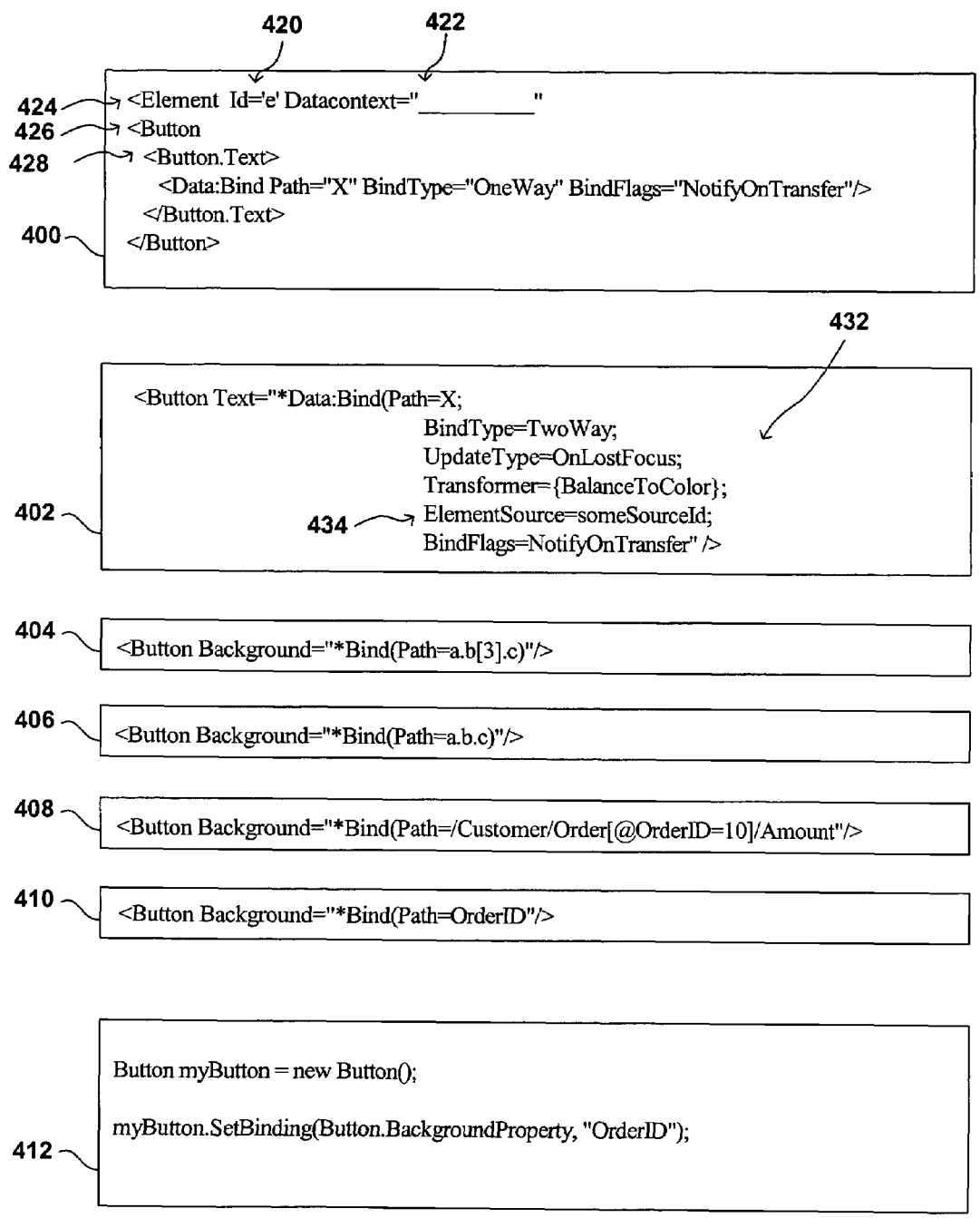
FIG. 4 illustrates several exemplary syntaxes for associating the user interface properties with the data in accordance with the present invention.

When a binding 226 and 228 is created, such as through markup, code, and the like, the binding engine 224 creates a binding object (e.g., binding objects 250 and 252) associated with the binding. For example, binding object 252 may represent binding 228 within the binding engine 224. Each binding object includes several properties (e.g., binding properties 260-272). Each of these binding properties 260-272 may be set programmatically. The following discussion describes each of these properties and FIG. 4 illustrates exemplary code for activating a binding that specifies some of these properties.

One of the binding properties (hereinafter referred to as path 260) identifies the manner in which to locate the source data value (via the source object). The path 260 may refer to a property, sub-property or indexer on the source object, a column in ADO (ActiveX Data Objects), an XPath on XML, and the like. Alternatively, the path may refer to a reflection or ADO path.

Another one of the binding properties (hereinafter referred to as bindtype 262 defines a type for the binding 226 and 228. In one embodiment, the bindtype includes oneWay, twoWay, and oneTime. As an illustration, binding 226 represents a twoWay binding and binding 228 represent a oneWay binding. One of these binding types is set as a default. In one embodiment, twoway binding is set as the default binding type.

When the bindtype 262 is specified as oneWay, this signals the binding engine 224 to update the target property (e.g., UI property 210) every time a change occurs in the associated source data value. OneWay bindtype is useful for binding a data value to a non-editable UI property, such as text color, text background, and the like. Using oneWay bindtype avoids the overhead of a twoWay bindtype, described below. This decrease in overhead is most noticeable when listening to changes in UI properties regarding layout content. For these UI properties, the dynamic properties of each of the children of the UI property must typically be listened to for changes to the UI property. OneWay bindtype may also be useful when changes in the UI property are just for showing other presentation detail.

When the bindtype 262 is specified as twoWay, this signals the binding engine 224 to update the target property every time a change occurs in the source data value and vice versa. TwoWay binding is especially helpful when binding data to an edit box where any changes made by the user in the edit box need to be propagated to the source data value. Another scenario for twoway binding is when another application is responsible for the source data field and those changes are reflected in an edit box.

When the bindtype 262 is specified as oneTime, this signals the binding engine 224 to initialize the target property once and then leave it untouched, even if the associated source data value is changed. The oneTime bindtype is useful when some target property needs to be initialized with some value from a source field and the data context is not known in advance. In addition, oneTime bindtype is useful for read-only use of unchanging source data values. If the data source does not support the property notification mechanism of the present invention (e.g., IPropertyChange interface), the target property that is specified as oneWay will be updated similarly as if the binding specified oneTime as the bindtype.

Another one of the binding properties (hereinafter referred to as updatetype 264) defines a type of update for the case in which bindtype 262 specifies twoWay. Typically, twoWay bindings listen for changes in the target property and propagate those changes back to the source data value. This process is referred to as updating the source. Normally, it is desirable to update whenever the target property changes. However, in certain situations, updating after every keystroke wastes cycles and denies the user the opportunity for correcting typing errors and the like. Updatetype 264 allows the user to specify when the updates should occur. In one embodiment, updatetype 264 may specify Immediate, OnLostFocus, and Explicit. Specifying Immediate will signal the binding engine to update the source data value after every change to the target property. Specifying OnLostFocus will signal the binding engine to update the source data value after the target element has lost keyboard focus. Specifying Explicit will signal the binding engine to update the source data value only when the application explicitly requests an update. Typically, this explicit request is performed via a method. Even though this method may be called for any setting of updatetype 264, the method is useful when the updatetype is set to Explicit. Exemplary methods are shown below:

---

Binding.GetBinding(myElement, myProperty).Update( ); and
MyElement.GetBinding(myProperty).Update( )

---

Another one of the binding properties (hereinafter referred to as source 266) identifies the source data item for the binding. Briefly, illustrated in FIG. 4 and described in conjunction therewith, the source 266 may be set programmatically or with markup. Programmatically, the developer provides an objectref to the object that the binding should use as the source data item. Briefly, described in detail in conjunction with FIG. 4, in markup, there are various methods for setting the source property.

Another one of the binding properties (hereinafter referred to as transformer 268) accepts a class reference. The class reference may be specified using <Namespace>. <Class>, <Assembly>. The class reference that is specified is invoked y the binding engine 224 to transform the source data value into a format accepted by he target property. A method within the class reference invokes this transformation, represented as transform 244 in FIG. 2. The class reference may also specify an inverse transform (not shown) for transforming the target property to a format accepted by the source data value. The transform 244 may supply UI semantics or be a custom type converter.

Another one of the binding properties (hereinafter referred to as culture 270) defines the manner in which the source data value should be handled before/after transforming the source data value. Culture 270 operates in conjunction with transformer 268 to allow developers to specify rules for transforming source data values. For example, the culture may specify a specific format for numbers, dates, and the like. In one embodiment, the culture 270 accepts a value of a type CultureInfo. The developer has the option of using the rules specified by the culture 270 when implementing the transform.

Another one of the binding properties (hereinafter referred to as bindflags 272) provides a mechanism for receiving events signaling the transfer of data. Because the above described method for data binding is asynchronous, the bindflags 272 allow a developer to know when the target has been updated with the new value. In order to use this mechanism, the bindflags 272 is set to "NotifyOnTransfer". A handler is then registered for the event using any customary ways. One exemplary use for this mechanism is as follows:

---

```
Public static void main( )
{
    //Add a handler
    elem.AddAttachedHandler(Binding.DataTranferEvent,
            new DataTranferEventHandler(OnDataTransfer),
            RoutedEventArgs.EventStage.Direct);
    //Event handler
    private static void OnDataTransfer(Element e,
    DataTransferEventArgs args)
    {
        DynamicProperty DP=args.DP;
        v=e.GetValue(DP);
        DoSomething(v);
    }
    source.field="new value";
}.
Another exemplary method is:
        void AddDataTransferHandler(UIElement elem)
        {
            // Add a handler
            elem.AddHandler(Binding.DataTransferEventID,
                new
                    DataTransferEventHandler(OnDataTransfer));
        }
        // Event handler
        private void OnDataTransfer(object sender,
        DataTransferEventArgs
        args)
        {
            DependencyProperty dp = args.Property;
            UIElement e = sender as UIElement;
            object v = e.GetValue(dp);
            DoSomething(v);
        }.
```

---

As shown in the above example code, once the OnDataTransfer event has been triggered, the developer knows that the dynamic property has been updated. Thus, the developer may then use the target value for further processing.

Figure 3:
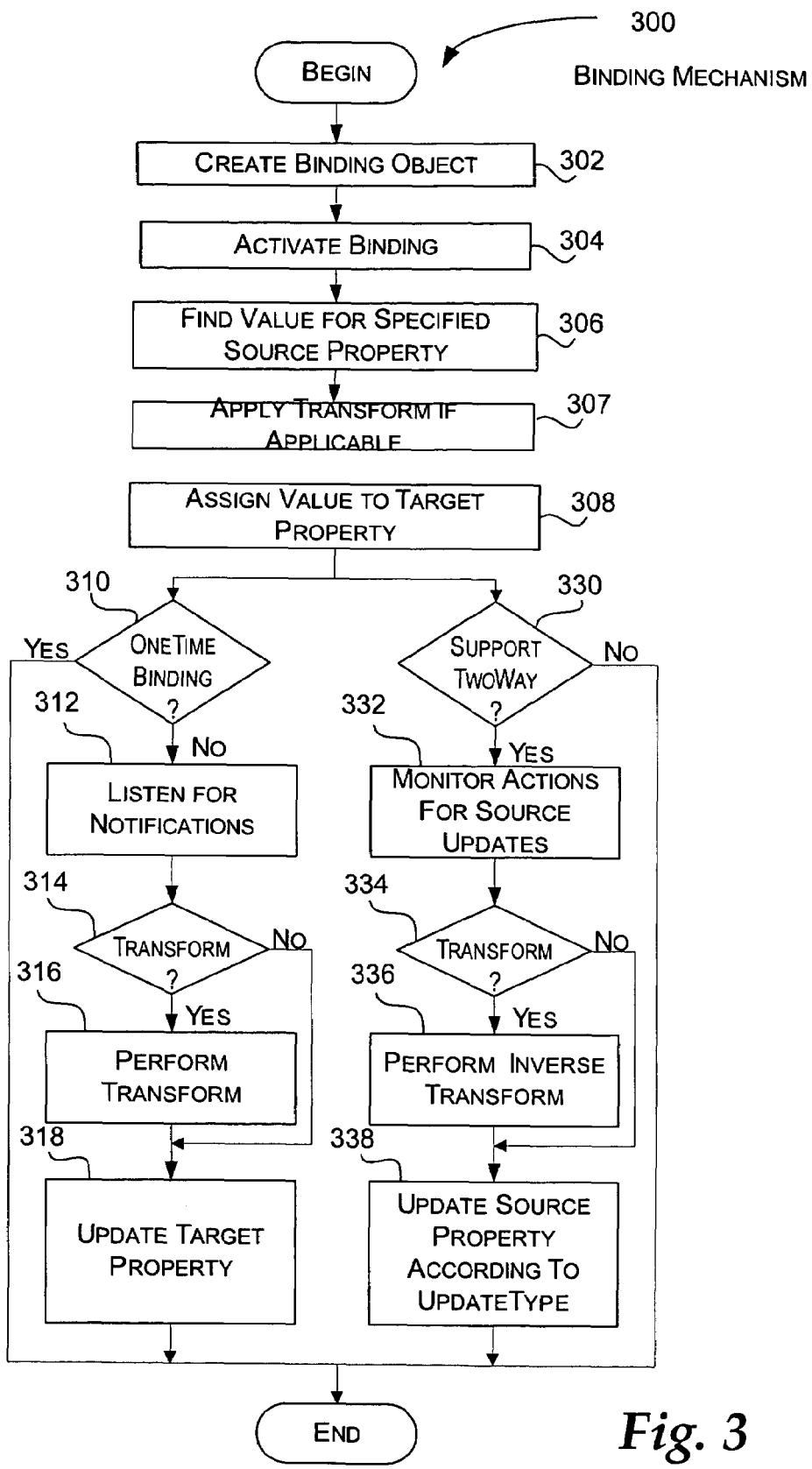
FIG. 3 is a logical flow diagram illustrating a process for binding a user interface property with a data value in accordance with one embodiment of the present invention.

FIG. 3 is a logical flow diagram illustrating a binding mechanism in accordance with one embodiment of the present invention. In overview, the binding mechanism performs actions to set-up the binding (blocks 302-306) and then performs actions (blocks 310-338) related to changes in the target property or source data value as specified in the binding. Processing continues at block 302.

At block 302, a binding object is created based on the arguments specified during the creation. Briefly, each property (i.e., properties 260-272 shown in FIG. 2) for the binding object 252 may be specified as an argument during the creation. The binding may be created through markup, programmatically, and the like. FIG. 4 illustrates exemplary syntaxes for creating a binding and specifying the properties 260-272. Each manner of creation specifies a source data item, a path to the data value in the source data item, a target UI element, and a target dynamic property on the UI element. While not shown in the present flow diagram, the properties of the binding object may also be modified dynamically during runtime, such as through the use of application programming interfaces (APIs). Processing proceeds to block 306.

At block 304, the binding is activated. In one embodiment, the binding may be activated automatically once the binding engine notices that there is sufficient context for the binding, such as having the source object exist, the target element ready to display, and the like. The binding engine is responsible for recognizing activation of the binding. Processing continues at block 304.

At block 306, a value for the specified source property is found. In one embodiment, reflection is used to find the value. Reflection is a general mechanism that allows a caller to obtain information about a requested object. The information includes objects that are supported, public properties, and the like. In another embodiment, when data item is a collection, the binding engine performs a number of heuristics to determine whether the to use the current record or the data object (collection) itself. A first heuristic is applied when the binding refers to a property or indexer. In this situation, the corresponding property or indexer on the collection object is used if such a property or indexer exists. Alternatively, the current record of the collection is used as the data item. Another heuristic is applied when no property or indexer exists. In this situation, the collection object is used for the target property as long as the collection object is valid. Otherwise, the current record is used. Before continuing to block 308, a transform is applied to the value if the binding specifies a transform (block 307). The application of a transform is described in detail in conjunction with block 316 below. Processing continues at block 308.

At block 308, the value that was found is assigned to the target property. In one embodiment, a property engine that is responsible for maintaining the hierarchy of the properties may assign the value. In another embodiment, a transform specified during creation of the binding may be invoked to transform the value before assigning the value to the target property. In a further refinement, the property engine may mark the property as having a new value. Once blocks 302-308 have been performed, the binding engine is ready for updating target properties and source data values as needed. In general, the binding mechanism is asynchronous.

Therefore, from block 308, processing continues through two asynchronous paths. A first path (blocks 310-318) is associated with updating the target property and a second path (blocks 330-338) is associated with updating the source data value. Each of these paths is described below. First, the path responsible for updating the target property is discussed.

At decision block 310, the binding engine determines whether the binding associated with the source data value and the target property has specified the bindtype as oneTime. If the bindtype is oneTime, processing is complete for this binding and proceeds to the end. One skilled in the art will recognize, that if the bindtype is oneTime, the binding engine does not listen for source property change events. Thus, in actual practice, the logic within the binding engine does not necessarily perform a check as shown in block 310. In addition, if the data item does not implement IPropertyChange, processing is complete. If, however, the bindtype is not oneTime, processing continues at block 312.

At block 312, the binding engine listens for notifications associated with the bindings. Because databinding does not directly update the target with the source data value, the present invention implements a notification mechanism. Notification mechanisms, such as property change notifications and collection view "CurrentChanged" notifications and the like, are known in the art and need not be discussed at length here. Different actions cause a notification, such as a data value change, a page navigation, shutdown, change in record of interest in a data collection, and the like. Because the present invention triggers an update upon a change in the record of interest in a data collection, the present invention provides a convenient mechanism for further de-coupling the user interface and the logic. For example, in accordance with the present invention, the developer only needs to write code in the logic to specify how to change to the next record of interest in a data collection. Once the change occurs, the binding engine, in accordance with the present invention, will update the user interface according to the bindings already specified. As mentioned before, this de-coupling of the user interface and the logic provides a more robust and more easily maintained application than when the user interface and logic are intertwined.

The following code is one exemplary implementation for the notification mechanism. While the exemplary code written below is written in C#, those skilled in the art will appreciate that various languages and syntax may be used to implement the notification mechanism. For any such implementation, an interface is defined for use by each data item. Each data item inherits this interface in order to implement dynamic updating.

```
Public interface IPropertyChange
{
    event PropertyChangedEventHandler PropertyChanged;
}.
```

Next, an event handler and its arguments are defined.

```
public delegate void
    PropertyChangedEventHandler(object sender,
PropertyChangedEventArgs e);
    public class PropertyChangedEventArgs : EventArgs
    {
        public virtual string PropertyName { get;}
    }.
```

The class PropertyChangedEventArgs includes one read-only property named PropertyName having a type string. The PropertyName property contains a name for the property which has changed. Each source data item then implements this interface by calling the PropertyChanged delegate whenever one of its properties has changed. The following is an illustrative example for implementing a source object (e.g., data item 232) in accordance with the embodiment for the notification mechanism.

```
public class myClass : IPropertyChange
{
    private string foo = "Hello World";
    public string Foo
    {
        get { return foo; }
        set { if(foo != value)
        {
            foo = value;
            NotifyPropertyChanged("foo");
        }
    }
    }
    public event PropertyChangedEventHandler Property Changed;
    private void NotifyPropertyChanged(string propName)
    {
        PropertyChanged(this, new
            PropertyChangedEventArgs(propName));
    }
}.
```

As shown above in the exemplary code, the 'set' method for the 'foo' property determines whether a new value is different than the old value. If the values differ, the handler is called. In another refinement, an empty string may be passed in the arguments to signal that all bindings to each of the data item's data values should be updated. This may occur when the source object is not certain about which properties have changed and would like each binding updated. Once the binding engine receives a notification that the data source value has changed, processing continues at decision block 314.

At decision block 314, a determination is made whether the binding associated with the source data value that changed specified a transform for the binding. If the binding does not specify a transform, processing continues at block 318. However, if the binding does specify a transform, processing continues at block 316.

At block 316, the transform that is specified in the binding is performed. In one embodiment, transformer 268 is an object as described below:

```
Public interface IDataTransformer
{
object Transform(object o, DependencyProperty dp, CultureInfo culture);
object InverseTransform(object o, PropertyInfo info, CultureInfo culture);
}.
```

For the above interface, o denotes the source value, dp denotes the target dynamic property, and culture denotes the culture to use during the transformation. The Transform( ) method transforms the source value o into an object suitable for assignment to the property denoted by dp. The Transform( ) method is called when propagating a data value from the source of a binding to the target property. If the Transform( ) method returns a value of null, the binding engine is signaled to stop propagating values.

The transformer may also be used for controlling other UI properties, such as width, height, font, positioning(x,y), and the like based on the associated source data value specified in the binding. Transformers provide the ability to perform logic on the data value in order to show the data in several ways. In a further refinement, a culture may be applied during the transform as specified in the binding. Processing continues at block 318.

At block 318, the target property is updated. In one embodiment, the property engine assigns the value to the target property. In addition, the target property may be marked as having a new value. Processing may then continue to block 312 and listen for the next property change notification associated with the binding. Once the application ends or the binding is otherwise terminated, processing proceeds to the end.

As mentioned above, from block 308, processing may continue through a second path. Thus, from block 308, processing continues at decision block 330. As mentioned above regarding decision block 310, the logic within the binding engine may not necessarily perform a check of the bindtype during decision block 310, but rather, because the binding engine was not told to listen for notifications when the binding was created, the process does not flow through the second path. However, for clarity in describing the flow, a decision block reflecting the bindtype is shown. Therefore, at decision block 330, a determination is made whether the binding specified twoWay as the bindtype. As discussed earlier, two-way allows changes in the target property to be propagated to the source data value. If the binding does not specify twoWay as the bindtype, processing proceeds to the end. However, if the binding does specify twoWay as the bindtype, processing continues at block 332.

At block 332, the binding engine will recognize certain actions that trigger an update to the source data value. Once a trigger occurs, processing continues at decision block 334.

At decision block 334, a determination is made whether the binding specifies an inverse transform for the binding. If the binding does not specify an inverse transform, processing continues at block 338. However, if the binding does specify an inverse transform, processing continues at block 336.

At block 336, the inverse transform is applied to the source property. In one embodiment, the inverse transformer is an object as described above in reference to the Public interface IDataTransformer.

For the above interface, o denotes the source value, culture denotes the culture to use during the transformation, and info denotes the PropertyInfo of the target property. The Inverse-Transform( ) method transforms the source value o into an object suitable for assignment to a property of type info. This method is called when propagating a value from the target of a binding to the source. If the InverseTransform( ) method returns a value of null, the binding engine does not propagate a value. Once the InverseTransform is performed, processing continues at block 338.

At block 338, the source property is updated according to the udpatetype. As described above, the updatetype may be immediate, on loss of focus, explicit, and others. Once the source property is updated, processing proceeds to the end.

FIG. 4 illustrates several exemplary means for creating a binding. Creation means 400-410 creates the binding through markup. Creation means 410 creates the binding through code. The illustrative means shown in FIG. 4 are not exhaustive. Other means (syntax) may be used without departing from the scope of the present invention.

Creation means 400 includes a DataContext name/value pair (hereinafter referred to as DataContext 422) and Id name/value pair (hereinafter referred to as Id 420) for an element 424. Because creation means 400 also includes DataContext 422, Id 420 is unnecessary. Id 420 is needed when it is desirable to refer to an explicit source, such as using ElementSource in markup or an IdObjectRef within code. Both of these uses are described below. DataContext 422 is a dynamic property defined on an element (e.g., element 424). The value associated with DataContext 422 represents the default source data item and is an inheritable property. The binding engine queries DataContext 422 and utilizes DataContext 422 when creating a binding for element 424 and descendent elements (e.g., Button element 426). The binding engine also listens for changes to DataContext 422, which triggers an update accordingly. Thus, while not required, DataContext 422 provides a convenient mechanism for establishing scope for all properties bound to a common data item. Descendant elements may have their own DataContext, which will take precedence over the DataContext 422 of the parent element. A binding may override DataContext 422 by supplying a non-null Source, described below in conjunction with creation means 402.

Button element 426 is illustrated with a target property (e.g., Button.Content 428). In accordance with the present invention, upon encountering "Data:Bind", the binding engine recognizes that a binding is being specified. Name/value pairs that follow, set the binding properties 260-272 as specified in FIG. 2. One skilled in the art will appreciate that the terms "Data:Bind" to signal a binding is an arbitrary term and any number of terms may have been used without departing from the present invention. Creation means 400 represents a verbose markup format.

Creation means 402 represents a compact markup format. The UI property (e.g., Button Text) is represented in a more compact fashion. Again, "Data:Bind" is used as a signal to the binding engine that what follows is a binding. Also, the name/value pairs following Data:Bind correspond to the desired properties 260-272 described earlier for the binding object 250 in FIG. 2. For example, ElementSource name/value pair (hereinafter referred to as ElementSource 434) corresponds to source 266.

In markup, there are two methods for setting the source property: ElementSource and DataSource. If neither of these is used, the default value for source is null which signals the binding engine, upon creation, to get the value of the element's DataContext property and use the value as the source object.

When a creation means (e.g., creation means 402) specifies an ElementSource, the binding engine finds the element whose ID is specified by the ElementSource property. That element's DataContext is then used as the source object. Relative pathnames, such as /Parent/Parent and /Previous/Previous, may be used to specify the datasource. When the binding engine encounters /Parent, it looks for the element parent to the current element in terms of object hierarchy. For example, if the element is a customer order, specifying /Parent may signal the binding engine to look for the element which corresponds to a customer for the current order. Specifying /Parent is useful in nested repeater cases in which it is desirable to use values from an outer repeater in the scope of an inner repeater. Specifying /Previous signals the binding engine to look for the element previous to the current element under the Repeater. Specifying /Previous is useful when it is desirable to access the current-n item in addition to the current item, such as in line graphs and the like. Successive /Previous and /Parent may be used in accordance with the present invention.

In another embodiment, markup may specify a DataSource. When a DataSource is specified, the binding engine accepts the resource id of a Resource. If the Resource exposes a data property, then the binding engine will set the Source of the binding to the object returned by the data property of the DataSource resource. Otherwise, the binding engine will set the source of the binding to the resource object itself.

Those skilled in the art will appreciate that there are various ways in which properties 260-272 may be expressed using a markup language, and therefore, the manner in which each of these other properties may be expressed using a markup language is not explained in further detail herein.

The next three creation means 404-410 provide illustrative examples on the type of items that the present invention may bind. Creation means 404 illustrates support of binding to sub-properties and indexers. Creation means 404 corresponds to a binding written in C# as di.a.b[3].c, wherein di is the relevant data item. As long as the data item, the class that implements di.a, the class that implements di.a.b, and the class that implements di.a.b[3].c all support the notification mechanism of the present invention (e.g., IPropertyChange) and notify when their properties change, the binding specified using creation means 404 will cause the binding engine to automatically update the bound property (e.g., the target property) to reflect changes in the source data value.

Creation means 406 illustrates support of binding to a data collection. The binding engine will automatically use the current record of the collection at each level (wherein a, b, and c represent different levels). For example, if di.a has a type IDataCollection, the binding uses the current record of the collection to fetch the "b" property. Thus, the binding engine automatically updates values associated with a data collection whenever the current record is changed.

Creation means 408 illustrates support of binding to XML node. The path 260 to the value is supplied using an XPath expression, such as "/Customer/Order[@OrderID=10]/Amount)", as shown in FIG. 4. Creation means 410 illustrates support of binding to ADO data tables. For this implementation, the path 260 to the value is supplied as a field name for a particular row, such as "OrderID", as shown in FIG. 4.

Creation means 410 creates the bindings programmatically. The developer provides an objectref to the object that the binding should use as the source data item. The program statements shown in creation means 412 create a binding with the same behavior as the one illustrated by creation means 410. The SetBinding method has a number of more elaborate variants by which the programmer can specify any of the binding properties discussed above. The simple example above uses the button's DataContext as the source object. The following program statements create a one-way binding that uses a specific object (known at runtime) as the source:

```
Object source = . . . some arbitrary object . . . ;
Binding.SetBinding(myButton,
    Element.BackgroundProperty, "Color",
BindType.OneWay, new ExplicitObjectRef(source));
```

The following exemplary program statements may also be used:

```
myButton.SetBinding(Button.BackgroundProperty,
    "Color", BindType.OneWay, new ExplicitObjectRef(source));
```

The following example code displays one implementation for controlling a user interface property with data via the binding mechanism of the present invention. In this example, the data value (e.g., myinteger) and the UI property (e.g., TextContent) are activated as a binding. In addition, a transform (e.g., MyTranformer) is specified for this binding.

```
<Test TextContent="*Data:Bind(Path=myInteger)"
Foreground="*Data:Bind(Path=MyInteger;Transformer=
MyTransformer)"/>
public class MyTransformer : IDataTransformer
```

-continued

```
{
    public object Transform(object o, DependencyProperty
        dp, CultureInfo
culture)
    {
        if((int)o <0) return Red;
            else return Black;
    }
    public object InverseTransform(object o, PropertyInfo
    info, CultureInfo
                    culture)
    {
        return null;
    }
}.
    The following exemplary code may also be used:
            <Element.Resources>
        <MyTransformer def:Name="xform"/>
<Element.Resources>
<SimpleText Text=" *Bind(Path=myInteger)"
                Foreground=""*Bind(Path=myInteger;
                Transformer={xform})" />
```

Exemplary APIs

System.Windows.Data

This namespace includes classes and interfaces used for binding properties to data sources, data source classes, data-specific implementations of collections and views, and handling exceptions in data entry. The following list the members exposed by the System.Windows.Data namespace.

Classes

ArrayListCollectionView encapsulates the collection view support for the ArrayListDataCollection collection class. This class cannot be inherited.

ArrayListDataCollection provides a built-in implementation of an array-list data collection with an underlying collection-view interface. It also implements ICollectionChange to provide notification when items are added, items are removed, or the whole collection is refreshed.

Bind Represents a bind declaration object, used to manage bindings between a dynamic property user interface (UI) and source data.

Binding Provides access to the single run-time instance of a binding. This class cannot be inherited.

BindingListCollectionView—A collection view class used for Microsoft® ActiveX® Data Objects (ADO) data views.

CollectionContainer—Objects of this class hold an existing collection structure—for example, an ArrayListDataCollection or some other DataSet inside the ItemCollection.

ContextAffinityCollectionView—Implements a collection view that includes checks for context affinity.

DataContextObjectRef—Supports object references to elements whose DataContext is being used as the source for a binding. This class cannot be inherited.

DataSourceObjectRef—Supports object references to data sources. This lass cannot be inherited.

DataTransferEventArgs—Encapsulates arguments for data transfer vents. The events are routed events that must typically be handled specifically by a designated handler based on the DataTransferEventHandler delegate.

ElementObjectRef—Represents an object reference to an element, with the object being specified by its element ID. This class cannot be inherited.

ExplicitObjectRef—Represents an object reference to an explicit object. This class cannot be inherited.

ListCollectionView—Implements a collection view for collections based on IList.

ObjectDataSource—Serves as a data source for data binding. Bindable data items can be specified as common language runtime types.

ObjectRef—The abstract class that is used as the parent class of DataContextObjectRef, ElementObjectRef, ExplicitObjectRef, and TypeObjectRef.

ParameterCollection—Objects of this class hold the collection of named parameters (with their corresponding values) for an SqlDataSource.

QueryCommand—This class represents a single select statement to be submitted to the database.

RefreshCompletedEventArgs—Encapsulates the arguments passed either in the RefreshCompleted event of ObjectDataSource, or in the RefreshCompleted event of XmlDataSource.

SqlCommandList—A list of sql commands and the names of the tables that they should be used to fill.

SqlDataSource—SqlDataSource gets data from a Microsoft SQL Server for use in databinding.

TransformerSource—Allows resource reference to a transformer class that is defined as code-behind in the current application.

TypeObjectRef—Supports object reference by type. This class cannot be inherited.

WinFSDataSource—The WinFSDataSource facilitates databinding of data stored in WinFS with Avalon applications XmlDataNamespaceManager—XmlDataNamespaceManager Class Used to declare namespaces to be used in Xml data binding XPath queries XmlDataSource—Serves as a data source for data binding to Extensible Markup Language (XML) content nodes.

XmlNamespace—Declares an individual namespace within an XML data source.

Interfaces

IContains—Used to create classes that declare filtering criteria for collection views.

IDataSource—Supports creation of data source objects. Data source objects are used for common representation of data for data binding.

IDataTransformer—Provides methods that enable client-side transformation of bound data.

Enumerations

BindFlags—Describes special properties of a binding.

BindStatus—Status of a Binding.

BindType—Describes how changes in data values will transfer to and from source properties and target properties of a binding.

SqlDataSourceMode—The enumeration of the possible modes that SqlDataSource can have. The mode determines what sort of data is returned when the application retrieves the value from the Data property.

UpdateType—Specifies when updates to the data source (target-to-source data transfer) should occur in a binding. Setting these values will only be relevant if a binding's BindType is set to TwoWay (or defaults to TwoWay).

Delegates

DataChangedEventHandler—Represents the method that handles the DataChanged event raised by data sources that implement IDataSource.

DataTransferEventHandler—Represents the method that handles a data transfer event raised by Binding.

RefreshCompletedEventHandler—Represents the method that handles the ObjectDataSource.RefreshCompleted and XmlDataSource.RefreshCompleted events.

```
class sealed System.Windows.Data.ArrayListCollectionView :
ListCollectionView :
ContextAffinityCollectionView : CollectionView : Object Implements:
IEnumerable
ICollectionChange ICurrentItem IComparer
{
    protected virtual Void OnCollectionChanged(Object sender,
CollectionChangeEventArgs args)
    protected virtual IList PrepareLocalArray(IList list)
}
class System.Windows.Data.ArrayListDataCollection : ArrayList :
Object Implements:
IList ICollection IEnumerable ICloneable ICollectionChange
ICollectionViewFactory
{
    public virtual Int32 Add(Object newItem)
    public virtual Void AddRange(ICollection range)
    public virtual Void Clear( )
    public virtual sealed CollectionView CreateView( )
    public virtual Void Insert(Int32 index, Object insertItem)
    public virtual Void InsertRange(Int32 index, ICollection c)
    public virtual Void Remove(Object removeItem)
    public virtual Void RemoveAt(Int32 index)
    public virtual Void RemoveRange(Int32 index, Int32 count)
    public virtual Void Reverse( )
    public virtual Void SetRange(Int32 index, ICollection c)
    public virtual Void Sort( )
}
```

Represents a bind declaration object, used to manage bindings between a dynamic property user interface (UI) and source data.

BeginDefer—Begins a defer cycle. Defer cycles are used to batch multiple bind declaration changes and improve performance.

Bind—Initializes a new instance of the Bind class. The Bind object represents the bind declaration of a binding.

EndDefer—Ends a defer cycle and updates the binding with the accumulated declaration changes made to the Bind declaration object.

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

IApplyValue.Apply—Applies the value to a property of an element. In this class, this method is not intended to be called directly.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

Properties

BindFlags—Gets or sets the flags that describe the binding.

BindType—Gets or sets the type of the binding.

Culture—Gets or sets the Cultureinfo to use in a transformer associated with the binding (which may be the default transformer, if the Transformer property is not specifically set on the Bind object).

DataContextSource—Gets or sets the reference to another element that this element should use as source for the binding's data context.

DataSource—Gets or sets the object reference to the data source of the binding.

ElementSource—Gets or sets a string naming the identifier (ID) of another element in the application that should be used as the data source for the binding.

ObjectSource—Gets or sets the object reference to the data source of the binding.

Path—Gets or sets the description or name of the desired data property in the source, or an XPath query to desired data if the binding is to Extensible Markup Language (XML) data.

Source—Gets or sets the source object of the binding, as a special object reference object.

Transformer—Gets or sets a reference to the transformer to apply to the bound property.

UpdateType—Gets or sets the update type used in this bind declaration.

The Bind class is used to create and maintain the bind declaration. The declaration establishes the various base properties required for a typical binding, such as the source property, the type of the binding's update relationship of source vs. bound data, and other characteristics of a particular binding.

A Bind object's properties can be manipulated after the binding has been established, using C# calls to properties.

Properties of the Bind class closely parallel the *Bind syntax used for establishing a bind declaration in a particular markup language (named "XAML").

Bind to a Property

This example describes how to bind to a property using "XAML".

All bindings include the following:
Target element
Target dynamic property
Source object
Source property In this case, the BoundColor property is the source property, myData is the source object, Button is the target element, and Background is the target property.

```
            <DockPanel ID="root"
    xmlns="http://schemas.microsoft.com/2003/xaml"
    xmlns:def="Definition"
  >
        <DockPanel.Resources>
            <ObjectDataSource def:Name="myDataSource"
TypeName="WCPSample.myData,BindNonTextPropertySample" />
        </DockPanel.Resources>
        <DockPanel>
            <DockPanel.DataContext>
                <Bind DataSource="{myDataSource}"/>
            </DockPanel.DataContext>
            <Button Background="*Bind(Path=BoundColor;BindType=
    OneWay)"
Width="200" Height="30">I am RED!</Button>
        </DockPanel>
    </DockPanel>
    Create a Binding
```

This example shows how to create a binding in C#. To do this, you attach the binding object for the SampleText source property in data to the Text property of the SimpleText element, mytext.

When calling the Bind constructor, you can pass the source object through the ExplicitObjectRef constructor to get an ObjectRef object. There are many possible signatures both for the Bind constructor and for the SetBinding convenience method, and it is even possible to create the entire binding with the convenience method without calling the Bind constructor at all, but this example splits the operation into the constructor piece and then the specific setting of that bind declaration on an individual property of an element. If you do this in two steps, then the bind declaration created as the intermediate can be reused for binding to more than one element in your application.

```
public void CreateBinding( )
{
    myDataObject = new myData(System.DateTime.Now);
    myBindDef = new Bind("MyDataProperty",
    BindType.TwoWay, new
ExplicitObjectRef(myDataObject));
    mytext.SetBinding(SimpleText.TextProperty, myBindDef);
    ...
}
    class sealed System.Windows.Data.Bind : Object Implements:
IApplyValue
{
    public Void BeginDefer( )
    public Void EndDefer( )
    public BindFlags get_BindFlags( )
    public BindType get_BindType( )
    public CultureInfo get_Culture( )
    public String get_DataContextSource( )
    public Object get_DataSource( )
    public String get_ElementSource( )
    public Object get_ObjectSource( )
    public String get_Path( )
    public ObjectRef get_Source( )
    public IDataTransformer get_Transformer( )
    public UpdateType get_UpdateType( )
    virtual sealed Void
    System.Windows.IApplyValue.Apply(DependencyObject target,
DependencyProperty dp)
    public Void set_BindFlags(BindFlags value)
    public Void set_BindType(BindType value)
    public Void set_Culture(CultureInfo value)
    public Void set_DataContextSource(String value)
    public Void set_DataSource(Object value)
    public Void set_ElementSource(String value)
    public Void set_ObjectSource(Object value)
    public Void set_Path(String value)
    public Void set_Source(ObjectRef value)
    public Void set_Transformer(IDataTransformer value)
    public Void set_UpdateType(UpdateType value)
}
enum sealed System.Windows.Data.BindFlags : Enum : ValueType :
Object
Implements: IComparable IFormattable IConvertible
{
    public static BindFlags NotifyOnTransfer
}
```

Get the Bind Declaration Object of a Binding Expression

Provides access to the single run-time instance of a binding. This class cannot be inherited.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetDataContext—Returns a data context. This method is a static accessor for a given binding's data context object.

GetHashCode—Serves as a hash function for a particular type, suitable for use in hashing algorithms and data structures like a hash table. Inherited from Object.

GetSources—Returns an array list of sources for the original binding expression.

GetType—Gets the Type of the current instance. Inherited from Object.

GetValue—Returns the evaluated value of a binding expression. This method is intended to be called statically.

GetView—Returns collection views of the data in the binding.

GetXmlNamespaceManager—Returns an Extensible Markup Language (XML) namespace manager object used by the binding attached to the provided element.

MemberwiseClone—Creates a shallow copy of the current Object. Inherited from Object.

OnAttach—Handles the notification that a binding expression has been set as a property's value. This method is called statically, but generally is not used by application code.

OnDetach—Handles the notification that a binding expression has been removed as a property's value. This method is called statically, but generally is not used by application code.

ReferenceEquals—Determines whether the specified Object instances are the same instance. Inherited from Object.

SetDataContext—Sets the data context of a binding for a given object/property combination. This method is intended to be called statically.

SetValue—Sets the value of a binding. Returns a value that indicates whether the given value could be accepted. This method is intended to be called statically.

SetXmlNamespaceManager—Sets a namespace manager object used by the binding attached to the provided element.

ToString—Returns a String that represents the current Object. Inherited from Object.

Update—Propagates the current value of the target property of a binding back to the source object.

Property Description

DataItem—Gets the data item currently in use by the binding. This could be a single object, or a collection, depending on the path conditions that established the binding.

DataSource—Gets the source of the binding, as a data source object. This might be an element from within the application or markup, or an external object that is specified as the data source resource.

ParentBind—Gets the Bind declaration object from which this Binding derived.

Status—Gets the status of a Binding.

Field Description

DataContextProperty—Declares the DependencyProperty for a binding's data context so that it can be set as a property in the *Bind syntax.

DataTransferEventID—A field that is used to identify the routing identifier (ID) for data transfer events. Reference this field statically.

XmlNamespaceManagerProperty—Declares the DependencyProperty for a binding's XML namespace manager, so that it can be set as a property in the *Bind syntax.

This class can be used to get the Bind Declaration Object of a Binding Expression, get the Status of a Binding, and control Updates to Data Bindings.

A related class, Bind, provides access to the bind declaration. The bind declaration is where you specify the property or path used in the binding and other declarations. The declaration can be specified either as properties of Bind or by using the bind declaration syntax in markup when first setting a DataContext on an element.

A Binding object can be obtained through the return value of calling GetBinding on a data bound object.

Get the Bind Declaration Object of a Binding Expression

The following C# example shows how to obtain the bind declaration object associated with a binding, by using the binding's target element and property. Having the bind declaration object available is useful because you may want to set or get properties that are carried in the declaration. Also, you could use this same declaration to qualify much of the bind declaration information needed for a totally different binding using the same data. To get the Bind declaration object, you need to get the Binding for a specified property on a target element. Then get the ParentBind property of the Binding object.

```
                Binding myBinding =
                mytext.GetBinding(SimpleText.TextProperty);
                if(myBinding!=null)
                {
                    Bind myBindDec;
                    myBindDec = myBinding.ParentBind;
                    . . . //now change properties of the bind
                    declaration, or re-use it for
another binding
                }
                class sealed System.Windows.Data.Binding :
                Expression : Object
{
    public Object get_DataItem( )
    public Object get_DataSource( )
    public Bind get_ParentBind( )
    public BindStatus get_Status( )
    public static Object GetDataContext(DependencyObject d)
    public virtual DependencySource[ ] GetSources( )
    public virtual Object GetValue(DependencyObject d,
    DependencyProperty dp)
    public static CollectionView GetView(Object collection)
    public static CollectionView GetView(Object collection,
    String name)
    public static Object
    GetXmlNamespaceManager(DependencyObject d)
    public virtual Void OnAttach(DependencyObject d,
    DependencyProperty dp)
    public virtual Void OnDetach(DependencyObject d,
    DependencyProperty dp)
    public static Void SetDataContext(DependencyObject d,
    Object value)
    public virtual Boolean SetValue(DependencyObject d,
    DependencyProperty dp,
Object value)
    public static Void
    SetXmlNamespaceManager(DependencyObject d,
XmlNamespaceManager value)
        public Void Update( )
            public static readonlyDependencyProperty
            DataContextProperty
            public static readonlyRoutedEventID
            DataTransferEventID
            public static readonlyDependencyProperty
            XmlNamespaceManagerProperty
}
enum sealed System.Windows.Data.Binding+BindStatus : Enum :
ValueType : Object
Implements: IComparable IFormattable IConvertible
{
            public static BindStatus Active
            public static BindStatus Detached
            public static BindStatus Inactive
            public static BindStatus NoDataItem
            public static BindStatus PathError
}
```

A collection view class used for Microsoft® ActiveX® Data Objects (ADO) data views.

Event Description

CollectionChanged occurs when the collection view changes. This could mean that items were added or removed in the collection, or that a new sort or filter was applied to this view. Inherited from CollectionView.

CurrentChanged occurs immediately after the record pointer position moves.

CurrentChanging occurs when a request is made to move the current record pointer. The requested move can be canceled by setting a handler and using the CancelEventArgs object within arguments of the event to cancel the event.

ProtectedCurrentChanged—A protected event. In derived classes, this event occurs after changing the position of the record pointer. Inherited from CollectionView.

ProtectedCurrentChanging—A protected event. In derived classes, this event occurs before a change in currency. If necessary, handlers of the event can cancel the change. Inherited from CollectionView.

Method Description

BindingListCollectionView—Initializes a new instance of the BindingListCollectionView class.

ChangedCurrent—Raises the implemented CurrentChanged event of the object. Inherited from CollectionView.

CheckUiContextAccess—Determines whether the calling thread is active within the context this collection view is bound to. Inherited from ContextAffinityCollectionView.

Compare—Return—, 0, or +, according to whether o1 occurs before, at, or after o2 (respectively)

Contains—Return true if the item belongs to this view. The item is assumed to belong to the underlying DataCollection; this method merely takes filters into account. It is used during collection-changed notifications, for instance.

ContainsItem—Return true if the item belongs to this view. No assumptions are made about the item. If the caller knows that the item belongs to the underlying collection, it is more efficient to call Contains.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Implementation of IEnumerable.GetEnumerator( ). This provides a way to enumerate the members of the collection without changing the currency.

GetHashCode—Serves as a hash function for a particular type, suitable for use in hashing algorithms and data structures like a hash table. Inherited from Object.

GetType—Gets the Type of the current instance. Inherited from Object.

IndexOf—Return the index where the given item belongs

MemberwiseClone—Creates a shallow copy of the current Object. Inherited from Object.

MoveFirst—Move Current to the first item.

MoveLast—Move Current to the last item.

MoveNext—Move Current to the next item.

MovePrevious—Move Current to the previous item.

MoveTo—Move Current to the given item.

OKToChangeCurrent—Determines whether it is allowable to change the position of the current record pointer. Inherited from CollectionView.

OnCollectionChanged—Implement this method to handle CollectionChanged events in the data collection that underlies the collection view. Inherited from CollectionView.

ReferenceEquals—Determines whether the specified Object instances are the same instance. Inherited from Object.

Refresh—Refreshes the view. Re-applies any current sort or filter operations, as set by various properties that declare sort or filter criteria.

ToString—Returns a String that represents the current Object. Inherited from Object.

VerifyUiContextAccess—Verifies that the calling thread is active within the context that this collection view is bound to. If not, an exception is raised. Inherited from ContextAffinityCollectionView.

Property Description

BOF—Return true if Current is before the beginning (Beginning-Of-File).

CanFilter—Gets a value that declares whether this view can be filtered on the basis of its Filter property. Inherited from CollectionView.

CanSort—Test if this CollectionView supports sorting before assigning a non-null value to Sort.

Collection—Gets the underlying data collection object. Inherited from CollectionView.

Comparer—Gets the comparison object being used by the collection view. Inherited from CollectionView.

Count—Return the estimated number of records (or −1, meaning "don't know").

Current—Return current item.

CurrentItem—Gets the current object in the data collection, by returning an object that implements a Current property as well as several other methods for moving or checking currency. Inherited from CollectionView.

EOF—Return true if Current is beyond the end (End-Of-File).

Filter—Gets or sets the filter applied to the data in a data collection view. Inherited from CollectionView.

Sort—Gets or sets the sort descriptions that apply a sort order to the collection.

UIContext—Gets the user interface (UI) context that this collection view is bound to. Inherited from ContextAffinityCollectionView.

ViewManagerData Gets implementation data about a view. Inherited from CollectionView.

```
class sealed System.Windows.Data.BindingListCollectionView
ContextAffinityCollectionView : CollectionView : Object Implements:
IEnumerable
ICollectionChange ICurrentItem IComparer
{
    public virtual sealed Int32 Compare(Object o1, Object o2)
    public virtual Boolean Contains(Object item)
    public virtual Boolean ContainsItem(Object item)
    public virtual sealed Boolean get__BOF( )
    public virtual sealed Boolean get__CanSort( )
    public virtual Int32 get__Count( )
    public virtual sealed Object get__Current( )
    public virtual sealed Boolean get__EOF( )
    public virtual SortDescription[ ] get__Sort( )
    public virtual IEnumerator GetEnumerator( )
    public virtual Int32 IndexOf(Object item)
    public virtual sealed Boolean MoveFirst( )
    public virtual sealed Boolean MoveLast( )
    public virtual sealed Boolean MoveNext( )
    public virtual sealed Boolean MovePrevious( )
    public virtual sealed Boolean MoveTo(Object item)
    public virtual Void Refresh( )
    public virtual Void set__Sort(SortDescription[ ] value)
}
enum sealed System.Windows.Data.BindType : Enum : ValueType :
Object
Implements: IComparable IFormattable IConvertible
{
        public static BindType OneTime
        public static BindType OneWay
        public static BindType Two Way
}
```

Implements a collection view that includes checks for context affinity.

Event Description

CollectionChanged—Occurs when the collection view changes. This could mean that items were added or removed in the collection, or that a new sort or filter was applied to this view. Inherited from CollectionView.

ProtectedCurrentChanged—A protected event. In derived classes, this event occurs after changing the position of the record pointer. Inherited from CollectionView.

ProtectedCurrentChanging—A protected event. In derived classes, this event occurs before a change in currency. If necessary, handlers of the event can cancel the change. Inherited from CollectionView.

Method Description

ChangedCurrent—Raises the implemented CurrentChanged event of the object. Inherited from CollectionView.

CheckUiContextAccess—Determines whether the calling thread is active within the context this collection view is bound to.

Contains—Determines whether a given data item belongs to this collection view. Inherited from CollectionView.

ContainsItem—Determines whether a given data item belongs to this collection view or the unfiltered collection. Inherited from CollectionView.

ContextAffinityCollectionView—Create a view to given collection.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Returns an enumerator that can iterate through the collection view. Inherited from CollectionView.

GetHashCode—Serves as a hash function for a particular type, suitable for use in hashing algorithms and data structures like a hash table. Inherited from Object.

GetType—Gets the Type of the current instance. Inherited from Object.

IndexOf—Returns the index where the given data item belongs in the collection, or −1 if the index of that item is unknown. Inherited from CollectionView.

MemberwiseClone—Creates a shallow copy of the current Object. Inherited from Object.

OKToChangeCurrent—Determines whether it is allowable to change the position of the current record pointer. Inherited from CollectionView.

OnCollectionChanged—Implement this method to handle CollectionChanged events in the data collection that underlies the collection view. Inherited from CollectionView.

ReferenceEquals—Determines whether the specified Object instances are the same instance. Inherited from Object.

Refresh—Refreshes the view. Reapplies any current sort or filter conditions, as set by various properties that declare sort or filter criteria. Inherited from CollectionView.

ToString—Returns a String that represents the current Object. Inherited from Object.

VerifyUiContextAccess—Verifies that the calling thread is active within the context that this collection view is bound to. If not, an exception is raised.

Property Description

CanFilter—Gets a value that declares whether this view can be filtered on the basis of its Filter property. Inherited from CollectionView.

CanSort—Gets a value that declares whether the collection can be sorted on basis of its Sort property. Inherited from CollectionView.

Collection —Gets the underlying data collection object. Inherited from CollectionView.

Comparer—Gets the comparison object being used by the collection view. Inherited from CollectionView.

Count—Gets the count of records in the collection. Inherited from CollectionView.

CurrentItem—Gets the current object in the data collection, by returning an object that implements a Current property as well as several other methods for moving or checking currency. Inherited from CollectionView.

Filter—Gets or sets the filter applied to the data in a data collection view. Inherited from CollectionView.

Sort—Gets or sets the sort order within the data collection view. Inherited from CollectionView.

UIContext—Gets the user interface (UI) context that this collection view is bound to.

ViewManagerData—Gets implementation data about a view. Inherited from CollectionView.

```
abstract class
   System.Windows.Data.ContextAffinityCollectionView :
CollectionView : Object Implements: IEnumerable
ICollectionChange
{
    protected Boolean CheckUiContextAccess( )
    protected UIContext get_UIContext( )
    protected Void VerifyUiContextAccess( )
}
class sealed System.Windows.Data.DataChangedEventHandler :
MulticastDelegate :
Delegate : Object Implements: ICloneable ISerializable
{
    public virtual IAsyncResult BeginInvoke(Object sender,
       EventArgs args,
    AsyncCallback callback, Object object)
    public virtual Void EndInvoke(IAsyncResult result)
    public virtual Void Invoke(Object sender, EventArgs args)
}
```

Supports object references to elements whose DataContext is being used as the source for a binding. This class cannot be inherited.

Method Description

DataContextObjectRef Initializes a new instance of the DataContextObjectRef class.

Equals Determines whether two Object instances are equal. Inherited from Object.

Finalize Allows an Object to attempt to free resources and perform other cleanup operations before the Object is reclaimed by garbage collection. Inherited from Object.

FindRootElement—Finds the root element for a given element. Inherited from ObjectRef.

GetDataObject—Returns the object that established data context for the specified object.

GetHashCode—Serves as a hash function for a particular type, suitable for use in hashing algorithms and data structures like a hash table. Inherited from Object.

GetObject—Returns the object that established data context for the specified object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

```
class sealed System.Windows.Data.DataContextObjectRef:
ObjectRef : Object
{
    public virtual Object GetDataObject(DependencyObject d)
    public virtual Object GetObject(DependencyObject d)
}
class sealed System.Windows.Data.DataSourceObjectRef :
ObjectRef : Object
{
    public virtual Object GetDataObject(DependencyObject d)
    public virtual Object GetObject(DependencyObject d)
}
```

Encapsulates arguments for data transfer events. The events are routed events that must typically be handled specifically by a designated handler based on the DataTransferEventHandler delegate.

Property Description

Handled—Sets or retrieves a value that indicates the present state of the event handling. Inherited from RoutedEventArgs.

OriginalSource—Returns OriginalSource object that raised the RoutedEvent. Inherited from RoutedEventArgs.

Property—Gets the specific property that changed and caused the data transfer event to be raised.

RoutedEventID—Returns the RoutedEventID associated with this RoutedEventArgs. Inherited from RoutedEventArgs.

Source—Gets the object that raised the event. Inherited from RoutedEventArgs.

Field Description

Empty—Represents an event with no event data. Inherited from EventArgs.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

InvokeEventHandler—Raises the data transfer event.

MemberwiseClone—Creates a shallow copy of the current Object. Inherited from Object.

OnSetSource—Invoked when the source of the event is set. Inherited from RoutedEventArgs.

ReferenceEquals—Determines whether the specified Object instances are the same instance. Inherited from Object.

SetRoutedEventID—Sets the RoutedEventID to the specified value Inherited from RoutedEventArgs.

SetSource—Sets the Source Property to the specified value Inherited from RoutedEventArgs.

ToString—Returns a String that represents the current Object. Inherited from Object.

```
class System.Windows.Data.DataTransferEventArgs :
RoutedEventArgs : EventArgs :
Object
{
    public DependencyProperty get_Property( )
```

-continued

```
protected virtual Void InvokeEventHandler(Delegate genericHandler,
    Object
genericTarget)
}
```

Represents the method that handles a data transfer event raised by Binding.
Parameters
sender—System.Object. The source object (instance of Binding) that raised the event.
args—System.Windows.Data.DataTransferEventArgs. Arguments of the event, as an instance of DataTransferEventArgs.

Return Value
System.Void.

Arguments of the event will inform you which bound property within the binding transferred data.

Binding does not expose this event as a member, but does expose the static DataTransferEventID property that is used to identify the event and attach a handler to that event.

How Do I Notify when Data is Transferred?

This example describes how to set up notification when data is transferred from the source to the target property.

According to one embodiment the operating system "Avalon" raises a data transfer event each time that data transfers from the source of a binding to a target. Internally, this event is used to inform the user interface (UI) that it should update, because the bound data has changed. Note that in order for the data transfer event to work, and also in order for one-way or two-way binding to work properly, you need to implement your data class using the IPropertyChange interface. For details on creating data items or classes that implement this interface, see Create a One-Way Binding to a Dynamically Updated Data Source.

In order to make this event available to your application, set the NotifyOnTransfer flag in the bind declaration. This can be done in a particular markup language (named "XAML"), using either the *Bind syntax or the BindFlags attribute of Bind, or in C#, by using parameters of the bind declarations. The handler you use to listen for this event must typically be attached directly to the element where you want to be informed of changes, or to the overall data context if you want to be aware that anything in the context has changed.

```
<SimpleText ID="RentText"
Text="*Bind(Path=Rent;BindType=OneWay;BindFlags=
NotifyOnTransfer)"
        Canvas.Top="50px" Canvas.Left="140px" Width="120px"
Height="20px" />
```

In the code, assign a handler based on the DataTransferEventHandler delegate, OnDataTransfer in this example, to handle the data transfer event. Use Binding.DataTransferEventID to get the necessary routing ID.

In this C# sample, clicking a button will cause new data to be generated and the values in various text boxes will be updated. When the event is raised and handled, a "Data Updated . . . " message is printed. Parameters of the event can be used to determine details about the property that changed (such as the type or the specific element if the same handler is attached to more than one element), which can be useful if there are multiple bound properties on a single element.

```
RentText.AddHandler(Binding.DataTransferEventID, new
DataTransferEventHandler(OnDataTransfer));
. . .
        public void OnDataTransfer(Object sender,
        DataTransferEventArgs
args)
        {
                FrameworkElement fe = sender as FrameworkElement;
                InfoText.Text = "";
                InfoText.Text += args.Property.Name + " property of a "
                        +
args.Property.OwnerType.Name;
                InfoText.Text += " element (";
                InfoText.Text += fe.ID;
                InfoText.Text += ") updated . . . ";
                InfoText.Text += (String)
System.DateTime.Now.ToLongDateString( );
                InfoText.Text += " at ";
                InfoText.Text += (String)
System.DateTime.Now.ToLongTimeString( );
        }
class sealed System.Windows.Data.DataTransferEventHandler :
MulticastDelegate :
Delegate : Object Implements: ICloneable ISerializable
{
        public virtual IAsyncResult BeginInvoke(Object sender,
DataTransferEventArgs args, AsyncCallback callback, Object object)
        public virtual Void EndInvoke(IAsyncResult result)
        public virtual Void Invoke(Object sender, DataTransferEventArgs
        args)
}
```

Represents an object reference to an element, with the object being specified by its element ID. This class cannot be inherited.

Method Description

ElementObjectRef—Initializes a new instance of the ElementObjectRef class.

Equals—Determines whether two Object instances are equal. Inherited from Object.

Finalize—Allows an Object to attempt to free resources and perform other cleanup operations before the Object is reclaimed by garbage collection. Inherited from Object.

FindRootElement—Finds the root element for a given element. Inherited from ObjectRef.

GetDataObject—Within derived classes, returns the data context object associated with the referenced object. Inherited from ObjectRef.

GetHashCode—Serves as a hash function for a particular type, suitable for use in hashing algorithms and data structures like a hash table. Inherited from Object.

GetObject—Returns the referenced object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

```
class sealed System.Windows.Data.ElementObjectRef : ObjectRef : Object
{
    public virtual Object GetObject(DependencyObject d)
}
```

Represents an explicit object reference to an element. This class cannot be inherited.

Method Description

Equals—Determines whether two Object instances are equal. Inherited from Object.

ExplicitObjectRef—Initializes a new instance of the ExplicitObjectRef class.

Finalize—Allows an Object to attempt to free resources and perform other cleanup operations before the Object is reclaimed by garbage collection. Inherited from Object.

FindRootElement—Finds the root element for a given element. Inherited from ObjectRef.

GetDataObject—Within derived classes, returns the data context object associated with the referenced object. Inherited from ObjectRef.

GetHashCode—Serves as a hash function for a particular type, suitable for use in hashing algorithms and data structures like a hash table. Inherited from Object.

GetObject—Returns the referenced object for the given DependencyObject context.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

This class is used to provide explicit references (by identifier (ID)) to objects used as source objects for bindings.

This class is a subclass of ObjectRef.

How Do I Create a Binding?

This example shows how to create a binding in C#. To do this, you attach the binding object for the SampleText source property in data to the Text property of the SimpleText element, mytext.

When calling the Bind constructor, you can pass the source object through the ExplicitObjectRef constructor to get an ObjectRef object. There are many possible signatures both for the Bind constructor and for the SetBinding convenience method, and it is even possible to create the entire binding with the convenience method without calling the Bind constructor at all, but this example splits the operation into the constructor piece and then the specific setting of that bind declaration on an individual property of an element. If you do this in two steps, then the bind declaration created as the intermediate can be reused for binding to more than one element in your application.

```
        public void CreateBinding( )
        {
                myDataObject = new myData(System.DateTime.Now);
                myBindDef = new Bind("MyDataProperty",
                BindType.TwoWay, new
ExplicitObjectRef(myDataObject));
                mytext.SetBinding(SimpleText.TextProperty, myBindDef);
                ...
```

-continued

```
        }
        class sealed System.Windows.Data.ExplicitObjectRef :
        ObjectRef :
Object
{
    public virtual Object GetObject(DependencyObject d)
}
        abstract interface System.Windows.Data.IContains
{
    public virtual Boolean Contains(Object item)
}
        abstract interface System.Windows.Data.IDataSource
{
    public virtual Object get_Data( )
    public virtual Void Refresh( )
}
        abstract interface System.Windows.Data.IDataTransformer
{
    public virtual Object InverseTransform(Object o, PropertyInfo
        info, CultureInfo
culture)
    public virtual Object Transform(Object o, DependencyProperty
        dp, CultureInfo
culture)
}
```

Implements a collection view for collections based on IList.

Event Description

CollectionChanged—Occurs when the collection view changes. This could mean that items were added or removed in the collection, or that a new sort or filter was applied to this view. Inherited from CollectionView.

ProtectedCurrentChanged—A protected event. In derived classes, this event occurs after changing the position of the record pointer. Inherited from CollectionView.

ProtectedCurrentChanging—A protected event. In derived classes, this event occurs before a change in currency. If necessary, handlers of the event can cancel the change. Inherited from CollectionView.

Method Description

ChangedCurrent—Raises the implemented CurrentChanged event of the object. Inherited from CollectionView.

CheckUiContextAccess—Determines whether the calling thread is active within the context this collection view is bound to. Inherited from ContextAffinityCollectionView.

Contains—Determines whether a given data item belongs to this collection view.

ContainsItem—Determines whether a given data item belongs to this collection view or to the unfiltered collection.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Returns an enumerator that can iterate through the collection view.

GetHashCode—Serves as a hash function for a particular type, suitable for use in hashing algorithms and data structures like a hash table. Inherited from Object.

GetType—Gets the Type of the current instance. Inherited from Object.

IComparer.Compare—Implements the comparison algorithm used by sorting in this collection. This method is not intended to be called directly.

ICurrentItem.MoveFirst—Moves the record pointer to the first record in the collection view.

ICurrentItem.MoveLast—Moves the record pointer to the last record in the collection view.

ICurrentItem.MoveNext—Moves the record pointer to the next record in the collection view.

ICurrentItem.MovePrevious—Moves the record pointer to the previous record in the collection view.

ICurrentItem.MoveTo—Moves the record pointer to the specified record in the collection view.

IndexOf—Returns the index where the given data item belongs in the collection, or −1 if the index of that item is unknown.

ListCollectionView—Initializes a new instance of the ListCollectionView class, using a supplied IList-derived collection.

MemberwiseClone—Creates a shallow copy of the current Object. Inherited from Object.

OKToChangeCurrent—Determines whether it is allowable to change the position of the current record pointer. Inherited from CollectionView.

OnCollectionChanged—Implement this method to handle CollectionChanged events in the data collection that underlies the collection view. Inherited from CollectionView.

PrepareLocalArray—Creates, filters and sorts the local index array. This method is also called when you call Refresh.

ReferenceEquals—Determines whether the specified Object instances are the same instance. Inherited from Object.

Refresh—Refreshes the view. Re-applies any current sort or filter operations, as set by various properties that declare sort or filter criteria.

ToString—Returns a String that represents the current Object. Inherited from Object.

VerifyUiContextAccess—Verifies that the calling thread is active within the context that this collection view is bound to. If not, an exception is raised. Inherited from ContextAffinityCollectionView.

Property Attribute Description

ActiveComparer—Gets the current active comparer used in sorting.

ActiveFilter—Gets the current active Contains information used in filtering.

CanFilter—Gets a value that declares whether this view can be filtered on the basis of its Filter property. Inherited from CollectionView.

CanSort—Gets a value that declares whether the collection can be sorted on the basis of its Sort property.

Collection—Gets the underlying data collection object. Inherited from CollectionView.

Comparer—Gets the comparison object being used by the collection view. Inherited from CollectionView.

Count—Gets the count of records in the collection.

CurrentIndex—Gets or sets the current index.

CurrentItem—Gets the current object in the data collection, by returning an object that implements a Current property as well as several other methods for moving or checking currency. Inherited from CollectionView.

CustomFilter—Gets or sets the custom filter criteria applied to the collection by the view.

CustomSort—Gets or sets the custom sort order applied to the collection by the view.

Filter—Gets or sets the filter applied to the data in a data collection view. Inherited from CollectionView.

InternalList—Gets or sets the internal (complete, unfiltered) collection.

Sort—Gets or sets the sort descriptions that apply a sort order to the collection.

UIContext—Gets the user interface (UI) context that this collection view is bound to. Inherited from ContextAffinityCollectionView.

UsesLocalArray—Gets a Boolean value that indicates whether sorting or filtering is taking place either on a local array copy or on the original data.

ViewManagerData—Gets implementation data about a view. Inherited from CollectionView.

```
class System.Windows.Data.ListCollectionView : ContextAffinityCollectionView :
CollectionView : Object Implements: IEnumerable ICollectionChange ICurrentItem
IComparer
{
    public virtual Boolean Contains(Object item)
    public virtual Boolean ContainsItem(Object item)
    protected IComparer get__ActiveComparer( )
    protected IContains get__ActiveFilter( )
    public virtual Boolean get__CanSort( )
    public virtual Int32 get__Count( )
    protected Int32 get__CurrentIndex( )
    public IContains get__CustomFilter( )
    public IComparer get__CustomSort( )
    protected IList get__InternalList( )
    public virtual SortDescription[ ] get__Sort( )
    protected Boolean get__UsesLocalArray( )
    public virtual IEnumerator GetEnumerator( )
    public virtual Int32 IndexOf(Object item)
    virtual sealed Void
System.ComponentModel.ICurrentItem.add__CurrentChanged(CurrentChangedEventHandler
value)
    virtual sealed Void
System.ComponentModel.ICurrentItem.add__CurrentChanging(CurrentChangingEventHandler
value)
        virtual sealed Boolean System.ComponentModel.ICurrentItem.get__BOF( )
        virtual sealed Object System.ComponentModel.ICurrentItem.get__Current( )
        virtual sealed Boolean System.ComponentModel.ICurrentItem.get__EOF( )
        virtual sealed Boolean System.ComponentModel.ICurrentItem.MoveFirst( )
        virtual sealed Boolean System.ComponentModel.ICurrentItem.MoveLast( )
```

```
-continued virtual sealed Boolean System.ComponentModel.ICurrentItem.MoveNext( )
    virtual sealed Boolean System.ComponentModel.ICurrentItem.MovePrevious( )
    virtual sealed Boolean System.ComponentModel.ICurrentItem.MoveTo(Object item)
    virtual sealed Void
System.ComponentModel.ICurrentItem.remove__CurrentChanged(CurrentChangedEventHandler
value)
    virtual sealed Void
System.ComponentModel.ICurrentItem.remove__CurrentChanging(CurrentChangingEventHandler
value)
        protected virtual IList PrepareLocalArray(IList list)
        public virtual Void Refresh( )
        protected Void set__ActiveComparer(IComparer value)
        protected Void set__ActiveFilter(IContains value)
        protected Void set__CurrentIndex(Int32 value)
        public Void set__CustomFilter(IContains value)
        public Void set__CustomSort(IComparer value)
        protected Void set__InternalList(IList value)
        public virtual Void set__Sort(SortDescription[ ] value)
        virtual sealed Int32 System.Collections.IComparer.Compare(Object o1, Object o2)
}
```

Serves as a data source for data binding. Bindable data items can be specified as common language runtime types.

Event Attribute Description

DataChanged—Raised when a new data object becomes available.

RefreshCompleted—Raised when the refresh operation has completed. This event is raised only if the data source is using Asynchronous mode.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ObjectDataSource—Initializes a new instance of the ObjectDataSource class.

ReferenceEquals—Determines whether the specified Object instances are the same instance. Inherited from Object.

Refresh—Creates the mid-tier data object based on the current value of the TypeName and Parameters properties. This method gets called automatically upon the first request for the data.

ToString—Returns a String that represents the current Object. Inherited from Object.

Property Attribute Description

Asynchronous—Gets or sets a property that declares whether data object creation will be performed in a worker thread or in the active (UI) context.

Data—Gets the underlying data object.

Parameters—Gets or sets a comma-delimited string that describes the arguments to be passed to the constructor of the instantiated object.

TypeName—Gets or sets the name of the common language runtime type to instantiate. This can be a fully-qualified type name, or a type defined locally in the assembly of the page.

```
class System.Windows.Data.ObjectDataSource : Object
Implements: IDataSource
{
    public Boolean get__Asynchronous( )
    public virtual sealed Object get__Data( )
    public String get__Parameters( )
    public String get__TypeName( )
    public virtual sealed Void Refresh( )
    public Void set__Asynchronous(Boolean value)
    public Void set__Parameters(String value)
    public Void set__TypeName(String value)
}
```

The abstract class that is used as the parent class of ElementObjectRef, ExplicitObjectRef, and TypeObjectRef.

Method Description

Equals—Determines whether two Object instances are equal. Inherited from Object.

Finalize—Allows an Object to attempt to free resources and perform other cleanup operations before the Object is reclaimed by garbage collection. Inherited from Object.

FindRootElement—Finds the root element for a given element.

GetDataObject—Within derived classes, returns the data context object associated with the referenced object.

GetHashCode—Serves as a hash function for a particular type, suitable for use in hashing algorithms and data structures like a hash table. Inherited from Object.

GetObject—Within derived classes, returns the data context object associated with the referenced object.

GetType—Gets the Type of the current instance. Inherited from Object.

MemberwiseClone—Creates a shallow copy of the current Object. Inherited from Object.

ObjectRef—Initializes a new instance of the ObjectRef class. This method is protected in the base class.

ReferenceEquals—Determines whether the specified Object instances are the same instance. Inherited from Object.

ToString—Returns a String that represents the current Object. Inherited from Object.

```
abstract class System.Windows.Data.ObjectRef : Object
{
    protected static DependencyObject
    FindRootElement(DependencyObject d)
    public virtual Object GetDataObject(DependencyObject d)
    public virtual Object GetObject(DependencyObject d)
}
```

Objects of this class hold the collection of named parameters (with their corresponding values) for an SqlDataSource.

Method Description

Add—Adds a named parameter to the parameter collection given the new parameter's name and value.

CopyTo—Copies all of the parameters in the parameter collection to a specified array, starting at a specified index in the array.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Gets an IEnumerator interface that can be used to enumerate over the parameters in the collection.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ParameterCollection—Initiates a new instance of the ParameterCollection class.

ReferenceEquals—Determines whether the specified Object instances are the same instance. Inherited from Object.

ToString—Returns a String that represents the current Object. Inherited from Object.

Property Description

Count—Gets the count of parameters in this parameter collection.

IsSynchronized—Gets a value that indicates whether access to this collection is synchronized (i.e., thread-safe).

Item—An indexer that gets or sets the object value of a named parameter in the collection.

SyncRoot—Gets an object that can be used to synchronize access to this parameter collection.

```
class System.Windows.Data.ParameterCollection :
Object Implements: ICollection
IEnumerable
{
    public Void Add(String paramName, Object initialValue)
    public virtual sealed Void CopyTo(Array array, Int32 index)
    public virtual sealed Int32 get__Count( )
    public virtual sealed Boolean get__IsSynchronized( )
    public Object get__Item(String paramName)
    public virtual sealed Object get__SyncRoot( )
    public virtual sealed IEnumerator GetEnumerator( )
    public Void set__Item(String paramName, Object value)
}
```

This class represents a single select statement to be submitted to the database.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

QueryCommand—Default constructor does nothing

ReferenceEquals—Determines whether the specified Object instances are the same instance. Inherited from Object.

ToString—Returns a String that represents the current Object. Inherited from Object.

Property Attribute Description

Table—Gets or sets the name of the table that will store query results.

Text—Gets or sets the Structured Query Language (SQL) query string of this query object.

```
class System.Windows.Data.QueryCommand : Object
{
    public String get__Table( )
    public String get__Text( )
    public Void set__Table(String value)
    public Void set__Text(String value)
}
```

Encapsulates the arguments passed either in the RefreshCompleted event of ObjectDataSource, or in the RefreshCompleted event of XmlDataSource.

Field Description

Empty—Represents an event with no event data. Inherited from EventArgs.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

RefreshCompletedEventArgs—Initializes a new instance of the RefreshCompletedEventArgs class.

ToString—Returns a String that represents the current Object. Inherited from Object.

Property Description

Exception—Gets the exception raised if the refresh operation resulted in an error.

```
class System.Windows.Data.RefreshCompletedEventArgs :
EventArgs : Object
{
    public Exception get_Exception( )
}
```

Represents the method that handles the ObjectDataSource.RefreshCompleted and XmlDataSource.RefreshCompleted events.

```
            Parameters
        sender System.Object. The object (data source)
        that raised the event.
        e System.Windows.Data.RefreshCompletedEventArgs.
        Arguments of
the event, as an instance of RefreshCompletedEventArgs.
        Return Value System.Void.
class sealed
System.Windows.Data.RefreshCompletedEventHandler
:MulticastDelegate
: Delegate : Object Implements: ICloneable ISerializable
{
    public virtual IAsyncResult BeginInvoke(Object sender,
    RefreshCompletedEventArgs
e, AsyncCallback callback, Object object)
        public virtual Void EndInvoke(IAsyncResult result)
    public virtual Void Invoke(Object sender,
    RefreshCompletedEventArgs e)
}
```

A list of sql commands and the names of the tables that they should be used to fill.
Method Description
Add—Adds a new SqlCommand object to the list.
AddChild—This method is called to add a child to this object.
AddText—This method is called when plain text appears under the tag in markup. In this case it is ignored.
Clear—Removes all entries in the list.
Contains—Determines if the specified QueryCommand is in the array. Both the Text and Table values must typically be equal to count as a match.
CopyTo—Copies the entire SqlCommandList to the specified one dimentional array starting at the specified index of the target array.
Equals—Determines whether two Object instances are equal. Inherited from Object.
Finalize—Allows an Object to attempt to free resources and perform other cleanup operations before the Object is reclaimed by garbage collection. Inherited from Object.
GetEnumerator—Returns an enumerator which enumerates all QueryCommands in this set
GetHashCode—Serves as a hash function for a particular type, suitable for use in hashing algorithms and data structures like a hash table. Inherited from Object.
GetType—Gets the Type of the current instance. Inherited from Object.
IList.Add
IList.Contains
IList.IndexOf
IList.Insert
IList.Remove
IndexOf—Returns the zero-based index of the first occurance of the specified value.
MemberwiseClone—Creates a shallow copy of the current Object. Inherited from Object.
ReferenceEquals—Determines whether the specified Object instances are the same instance. Inherited from Object.
Remove—Removes the first occurance of the specified QueryCommand from the list.
RemoveAt—Removes the QueryCommand at the given position.
SqlCommandList
ToString—Returns a String that represents the current Object. Inherited from Object.
Property Description
Count—Returns the number of elements contained in the list.
Item—Returns the QueryCommand at the given index.

```
class System.Windows.Data.SqlCommandList :
Object Implements: IList ICollection
IEnumerable IAddChild
{
    public Void Add(QueryCommand command)
    public virtual sealed Void AddChild(Object o)
    public virtual sealed Void AddText(String s)
    public virtual sealed Void Clear( )
    public Boolean Contains(QueryCommand value)
    public virtual sealed Void
    CopyTo(Array array, Int32 index)
    public virtual sealed Int32 get_Count( )
    public QueryCommand get_Item(Int32 index)
    public virtual sealed IEnumerator GetEnumerator( )
    public Int32 IndexOf(QueryCommand value)
    public Void Remove(QueryCommand value)
    public virtual sealed Void RemoveAt(Int32 index)
    public Void set_Item(Int32 index, QueryCommand value)
    virtual sealed Boolean
    System.Collections.ICollection.get_IsSynchronized( )
    virtual sealed Object
    System.Collections.ICollection.get_SyncRoot( )
    virtual sealed Int32
    System.Collections.IList.Add(Object command)
    virtual sealed Boolean
    System.Collections.IList.Contains(Object value)
    virtual sealed Boolean
    System.Collections.IList.get_IsFixedSize( )
    virtual sealed Boolean
    System.Collections.IList.get_IsReadOnly( )
    virtual sealed Object
    System.Collections.IList.get_Item(Int32 index)
    virtual sealed Int32
    System.Collections.IList.IndexOf(Object value)
    virtual sealed Void
    System.Collections.IList.Insert(Int32 index, Object command)
    virtual sealed Void
    System.Collections.IList.Remove(Object value)
    virtual sealed Void
    System.Collections.IList.set_Item(Int32 index, Object value)
}
```

According to one embodiment, SqlDataSource gets data from a Microsoft SQL Server for use in databinding.
Event Attribute Description
DataChanged—This event is raised when a new data object becomes available.
WriteComplete—This event is fired when data has been written back to the database.
Method Description
BeginParamChange—Temporarily defers any updates to the dataset (unless requested explicitly with Refresh( )) until the EndParamChange method is called
EndParamChange—Signals that parameters have been updated and that the dataset should be refreshed from the Sql server. This will not refresh the dataset if none of the parameters have been changed. To update the dataset unconditionally use the Refresh method.

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

Refresh—Initiates a Refresh Operation on the DataSource that will ultimately result in the Data property to change, if the Data property changes the DataChanged event should fire. This method is called automatically at the first request for the data SqlDataSource—The default constructor creates a new SqlDataSource with a blank connection string and a blank query ToString—Returns a String that represents the current Object. Inherited from Object.

WriteChanges—Commits the changes made to the data back to the database asynchronously.

Property Attribute Description

ConnectionString—This is the Sql server connection string, it indicates things like where to find the sql server and what uid and password to use.

Data—Returns the underlying data object.

DataSet—This gives the developer access to the underlying DataSet so the functionality of ADO can be used if necessary DataSourceMode—The DataSourceMode determines what sort of object will be returned as the Data property.

DeferredParamChange—This flag indicates whether to refresh the data set immediately when a parameter's value changes or wait until EndParamChange( ) mehtod is called.

ReadResult—If an error happened when querying the database it can be viewed here Select—The collection of QueryCommand objects which are used to query the database.

SelectParameters—Exposes the ParameterCollection object which contains the names and values of all of the named parameters.

WriteResult—If an error happened when writing changes back to the database it can be viewed here

```
class System.Windows.Data.SqlDataSource :
Object Implements: IDataSource
{
    public Void BeginParamChange( )
    public Void EndParamChange( )
    public String get_ConnectionString( )
    public virtual sealed Object get_Data( )
    public DataSet get_DataSet( )
    public SqlDataSourceMode get_DataSourceMode( )
    public Boolean get_DeferredParamChange( )
    public Exception get_ReadResult( )
    public SqlCommandList get_Select( )
    public ParameterCollection get_SelectParameters( )
    public Exception get_WriteResult( )
    public virtual sealed Void Refresh( )
    public Void set_ConnectionString(String value)
```

-continued

```
    public Void set_DataSourceMode(SqlDataSourceMode value)
    public Void WriteChanges( )
}
enum sealed
System.Windows.Data.SqlDataSource+SqlDataSourceMode : Enum :
ValueType : Object Implements: IComparable IFormattable IConvertible
{
    public static SqlDataSourceMode DataReader
    public static SqlDataSourceMode DataSet
    public static SqlDataSourceMode XmlReader
}
```

Allows resource reference to a transformer class that is defined as code-behind in the current application.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

IDataTransformer.InverseTransform—Aliases your custom transformer's InverseTransform method implementation. This method is not intended to be called directly.

IDataTransformer.Transform—Aliases your custom transformer's Transform method implementation. This method is not intended to be called directly.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

TransformerSource—Initializes a new instance of the TransformerSource class.

Property Description

TypeName—Gets or sets the assembly and class information for the transformer class that this TransformerSource instance is aliasing for.

How Do I Transform Bound Data?

This example shows how to transform data that is used in bindings.

To transform data, you create a class that implements the IDataTransformer interface, which includes the Transform and InverseTransform methods.

In this C# example, the transformer works against two possible properties of a binding: the text within a text block and the foreground color. The same transformer can return either result as the appropriate type, based on switching on the dp input parameter. This is a useful feature in a transformer because the transformer is attached to a bind declaration, and the same bind declaration can be used to create multiple bindings on a single data source for properties of different destination types.

```
public class MyTransformer : IDataTransformer
{
    public object Transform(object o, DependencyProperty dp,
System.Globalization.CultureInfo culture)
```

-continued

```
{
        DateTime date = (DateTime)o;
        switch (dp.Name) {
            case "Text":
                    return "Heute ist" + date.ToString("F", new
System.Globalization.CultureInfo("de-DE"));
            case "Foreground":
                    return Colors.Red;
            default:
                    return o;
        }
    }
    public object InverseTransform(object o,
System.Reflection.PropertyInfo info, System.Globalization.CultureInfo
culture)
    {
        return null;
    }
}
```

Using "XAML", a transformer class is an application resource. If the transformer code is written as code-behind inside the same application, the resource is created as a TransformerSource element. This TransformerSource element allows you to avoid a circular reference problem with trying to reference a custom element inside resources before the transformer class itself is compiled further down in the code. Then, to specify the transformer within a binding, set the transformer attribute to the resource name of your TransformerSource element in resources. This example uses compound syntax to set the binding, but the transformer can also be set in *Bind syntax.

```
<Canvas
    xmlns="http://schemas.microsoft.com/2003/xaml"
    xmlns:def="Definition" def:Language="C#"
    def:Class="WCPSample.MarkupTransformer"
    def:CodeBehind="default.xaml.cs"
    ID="root"
    >
    <Canvas.Resources>
        <ObjectDataSource def:Name="myDataSource"
TypeName="WCPSample.myData,MarkupTransformerSample" />
        <TransformerSource
            def:Name="MyTransformerReference"
TypeName="MyTransformer"/>
    </Canvas.Resources>
    <Canvas.DataContext>
        <Bind DataSource="{myDataSource}"
            BindType="OneWay" />
    </Canvas.DataContext>
    <SimpleText Canvas.Top="10px" Canvas.Left="5px"
FontWeight="Bold" FontSize="18" Text="Untransformed data"/>
    <SimpleText Canvas.Top="30px" Canvas.Left="35px"
Width="300px" ID="mytext" Text="*Bind(Path=TheDate)"/>
    <SimpleText Canvas.Top="50px" Canvas.Left="5px"
FontWeight="Bold" FontSize="18" Text="Transformed data"/>
    <SimpleText Canvas.Top="70px" Canvas.Left="35px"
        Width="300px"
Height="30px" ID="mytransformedtext">
        <SimpleText.Text>
            <Bind Path="TheDate"
Transformer="{MyTransformerReference}"/>
        </SimpleText.Text>
        <SimpleText.Foreground>
            <Bind Path="TheDate"
Transformer="{MyTransformerReference}"/>
        </SimpleText.Foreground>
    </SimpleText>
</Canvas>
```

Using C#, you can specify the transformer when you create a new bind declaration object. Get an instance of your transformer by calling its constructor, and pass that instance as an argument to either a property of an existing bind declaration or in the bind declaration constructor. In the following example, myChangedData is a custom data item, which contains the TheDate property.

```
Bind myNewBindDef=new Bind(
        "TheDate",
        BindType.OneWay,
        new ExplicitObjectRef(myChangedData),
        UpdateType.Immediate,
        new MyTransformer( ),
        newSystem.Globalization.CultureInfo("en-US")
    );
```

```
class System.Windows.Data.TransformerSource : Object Implements:
IDataTransformer
{
    public String get__TypeName( )
    virtual sealed Object
System.Windows.Data.IDataTransformer.InverseTransform(Object o,
PropertyInfo
info, CultureInfo culture)
        virtual sealed Object
System.Windows.Data.IDataTransformer.Transform(Object o,
DependencyProperty dp,
CultureInfo culture)
        public Void set__TypeName(String value)
}
```

Supports object reference by type. This class cannot be inherited.

Method Description

Equals—Determines whether two Object instances are equal. Inherited from Object.

Finalize—Allows an Object to attempt to free resources and perform other cleanup operations before the Object is reclaimed by garbage collection. Inherited from Object.

FindRootElement—Finds the root element for a given element. Inherited from ObjectRef.

GetDataObject—Within derived classes, returns the data context object associated with the referenced object. Inherited from ObjectRef.

GetHashCode—Serves as a hash function for a particular type, suitable for use in hashing algorithms and data structures like a hash table. Inherited from Object.

GetObject—Returns the object reference for a given data context.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

TypeObjectRef—Initializes a new instance of the TypeObjectRef class.

```
class sealed System.Windows.Data.TypeObjectRef :
ObjectRef : Object
{
    public virtual Object GetObject(DependencyObject d)
}
enum sealed System.Windows.Data.UpdateType : Enum :
ValueType : Object
Implements: IComparable IFormattable IConvertible
{
        public static UpdateType Explicit
        public static UpdateType Immediate
        public static UpdateType OnLostFocus
}
```

The WinFSDataSource facilitates databinding of data stored in WinFS with Avalon applications Event Description DataChanged—This event gets fired when new data is available or when that data changes DataUpdated—This event gets fired following a call to WriteChanges( )

Method Description

Dispose—If the client choses to dispose this object it will close the FindResult if it is still open. Otherwise it will be done in the finalizer.

Equals—Determines whether two Object instances are equal. Inherited from Object.

Finalize—The Finalizer will close the FindResult if it has not been closed earlier GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

Refresh—This method causes the query to be executed and new data to be returned. When the new data is ready the DataChanged event is fired.

ToString—Returns a String that represents the current Object. Inherited from Object.

Update—Writes any changes to the data back to the winfs store WinFSDataSource—Default constructor Property Description ContextString—Use this property to specify a WinFS store other than the default store.

Data—Returns the underlying data object

Query—The Query object must typically have it's

XmlDataNamespaceManager Class—Used to declare namespaces to be used in Xml data binding XPath queries Method Description AddNamespace—Adds the given namespace to the collection. Inherited from XmlNamespaceManager.

AddText—IAddChild implementation

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Provides support for the "foreach" style iteration over the collection of namespaces in the XmlNamespaceManager . Inherited from XmlNamespaceManager.

GetHashCode—Serves as a hash function for a particular type, suitable for use in hashing algorithms and data structures like a hash table. Inherited from Object.

GetNamespacesInScope—Gets a collection of namespace names keyed by prefix which can be used to enumerate the namespaces currently in scope. Inherited from XmlNamespaceManager.

GetType—Gets the Type of the current instance. Inherited from Object.

HasNamespace—Gets a value indicating whether the supplied prefix has a namespace defined for the current pushed scope. Inherited from XmlNamespaceManager.

IAddChild.AddChild

LookupNamespace—Gets the namespace URI for the specified prefix. Inherited from XmlNamespaceManager.

LookupPrefix—Finds the prefix declared for the given namespace URI. Inherited from XmlNamespaceManager.

MemberwiseClone—Creates a shallow copy of the current Object. Inherited from Object.

PopScope—Pops a namespace scope off the stack. Inherited from XmlNamespaceManager.

PushScope—Pushes a namespace scope onto the stack. Inherited from XmlNamespaceManager.

ReferenceEquals—Determines whether the specified Object instances are the same instance. Inherited from Object.

RemoveNamespace—Removes the given namespace for the given prefix. Inherited from XmlNamespaceManager.

ToString—Returns a String that represents the current Object. Inherited from Object.

XmlDataNamespaceManager—Constructor

Property Description

DefaultNamespace—Gets the namespace URI for the default namespace. Inherited from XmlNamespaceManager.

NameTable—Gets the XmlNameTable associated with this object. Inherited from XmlNamespaceManager.

```
class System.Windows.Data.WinFSDataSource : Object
Implements: IDataSource
IDisposable
{
    public virtual sealed Void Dispose( )
    protected virtual Void Finalize( )
    public String get_ContextString( )
    public virtual sealed Object get_Data( )
    public Query get_Query( )
    public virtual sealed Void Refresh( )
    public Void set_ContextString(String value)
    public Void set_Query(Query value)
    public Void Update( )
}
```

```
class System.Windows.Data.XmlDataNamespaceManager :
XmlNamespaceManager :
Object Implements: IXmlNamespaceResolver IEnumerable IAddChild
{
    public virtual sealed Void AddText(String s)
    virtual sealed Void
    System.Windows.Serialization.IAddChild.AddChild(Object o)
}
```

Serves as a data source for data binding to Extensible Markup Language (XML) content nodes.

Event Attribute Description

DataChanged—Raise this event when a new data object becomes available.

RefreshCompleted—Notifies when the refresh operation has completed. This event is typically only raised if the data source is asynchronous, and that typically will only be the case when the XML source is an external file rather than inline XML.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

Parse—Parses the object's XML content, using the specified reader and context.

ReferenceEquals—Determines whether the specified Object instances are the same instance. Inherited from Object.

Refresh—Resets the data collection maintained by this object, based on the result from the XPath query.

ToString—Returns a String that represents the current Object. Inherited from Object.

XmlDataSource—Initializes a new instance of the Xml-DataSource class.

Property Attribute Description

Data—Gets the underlying data object. If the source of the data is an external file, the first access to this property will return null (because the data is handled asynchronously).

Document—Gets or sets the underlying data as an XML document. This is the property representation of any inline XML data established for this object.

Source—Gets or sets the Uniform Resource Identifier (URI) source of the external XML data used by this object.

XmlNamespaceManager—Gets or sets the mamespace manager used for executing XPath queries.

XPath—Gets or sets the XPath query used to produce an appropriate node list to use for data binding this object.

How Do I Bind to XML Data?

This example describes how to bind to data in an XML data source. You can bind to a data source that is an XML node or a collection of XML nodes.

In this particular markup language (named "XAML") example, a data source is coded in an application's main "XAML" page as one of the resources of an outermost Dock-Panel. The actual XML data is supplied within the resource. This arrangement is sometimes called an XML data island.

The following example shows a very short XML data island that has a Books tree containing Book elements. The XmlDataSource resource is used to define the XML data source that contains the Books data.

```
<DockPanel
        xmlns="http://schemas.microsoft.com/2003/xaml/"
xmlns:def="Definition">
    <DockPanel.Resources>
        <XmlDataSource def:Name="BookData" XPath="/Books">
            <Books xmlns="">
                <Book ISBN="0-7356-0562-9" Stock="in">
                    <Title>XML in Action</Title>
                    <Summary>XML Web Technology</Summary>
                </Book>
```

-continued

```
                <Book ISBN="0-7356-1370-2" Stock="in">
                    <Title>Programming Microsoft Windows With
                        C#</Title>
                    <Summary>C# Programming Using the .NET
Framework</Summary>
                </Book>
                <!-- ... other Book entries ... -->
            </Books>
        </XmlDataSource>
        <Style def:Name="BookDataStyle">
            <ContentPresenter/>
            <Style.VisualTree>
                <SimpleText FontSize="Small" Foreground="Black">
                    <SimpleText.Text>
                        <Bind Path="Title"/>
                    </SimpleText.Text>
                </SimpleText>
            </Style.VisualTree>
        </Style>
    </DockPanel.Resources>
    <!-- Bind a ListBox to the query-selected books -->
    <ListBox ItemStyle=" {BookDataStyle}">
        <ListBox.Items>
            <CollectionContainer>
                <CollectionContainer.Collection>
                    <Bind DataSource="{BookData}"
                        Path="Book"/>
                </CollectionContainer.Collection>
            </CollectionContainer>
        </ListBox.Items>
    </ListBox>
</DockPanel>
```

An initial XPath query on the collection is coded by assigning the XPath attribute. This query string value will cause the data source to appear as a collection of data items. By varying the XPath query on the data source, the initial XML data collection that is exposed can be controlled. The XmlDataSource is also given an identifier (ID) by assigning BookData to the def:Name attribute.

A ListBox element can be used to bind to the XML data collection. The "XAML" markup above shows code for a ListBox that displays the titles of the books in the collection. A data style is defined that binds to the Title element of each Book element in the data. This style is defined in the main DockPanel's resources so it can be shared within the scope of that DockPanel. The Style is given the name BookDataStyle. This style can then be repeatedly applied by a ListBox control whose collection is bound to the BookData data source. The ListBox's ItemStyle attribute is how the item style is specified to the ListBox.

```
class System.Windows.Data.XmlDataSource : Object Implements:
IDataSource
IParseLiteralContent
{
    public virtual sealed Object get_Data( )
    public XmlDocument get_Document( )
    public String get_Source( )
    public XmlNamespaceManager get_XmlNamespaceManager( )
    public String get_XPath( )
    public virtual Void Parse(TextReader textReader,
    ParserContext parserContext)
    public virtual sealed Void Refresh( )
    public Void set_Document(XmlDocument value)
    public Void set_Source(String value)
    public Void
    set_XmlNamespaceManager(XmlNamespaceManager value)
    public Void set_XPath(String value)
}
```

Declares an individual namespace within an Extensible Markup Language (XML) data source.

Method Description

Equals—Determines whether two Object instances are equal. Inherited from Object.

Finalize—Allows an Object to attempt to free resources and perform other cleanup operations before the Object is reclaimed by garbage collection. Inherited from Object.

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

ToString—Returns a String that represents the current Object. Inherited from Object.

XmlNameSpace—Initializes a new instance of the XmlNameSpace class.

Property Description

Prefix—Gets or sets the prefix to use for this namespace.

Uri—Gets or sets the Uniform Resource Identifier (URI) for this namespace.

```
class System.Windows.Data.XmlNamespace : Object
{
    public String get_Prefix( )
    public String get_Uri( )
    public Void set_Prefix(String value)
    public Void set_Uri(String value)
}
```

The delegate to use for handlers that receive the DataContextChanged event.

```
class sealed System.Windows.DataContextChangedEventHandler :
MulticastDelegate :
Delegate : Object Implements: ICloneable ISerializable
{
    public virtual IAsyncResult BeginInvoke(Object sender,
        EventArgs args,
    AsyncCallback callback, Object object)
        public virtual Void EndInvoke(IAsyncResult result)
        public virtual Void Invoke(Object sender, EventArgs args)
}
```

Method Description

AddHandler—Add an instance handler for the given RoutedEventID Inherited from ContentElement.

AddToEventRoute—Adds handlers for the current instance to the route Inherited from ContentElement.

BuildRoute—Builds the event route Inherited from ContentElement.

CaptureMouse—Captures the mouse to this element. Inherited from ContentElement.

ClearAllBindings—Removes all bindings attached to an element.

ClearBinding—Removes the binding attached to the specified DependencyProperty.

ClearValue—Clears the local value of a property Inherited from DependencyObject.

DeferLoad—This purpose of this method as the name indicates is to defer the firing of the Loaded event EndDeferLoad—This call is meant to match a prior DeferLoad call, thereby cause Loaded event to be fired if there are no more pending EndDeferLoad calls.

Equals—Determines whether two Object instances are equal. Inherited from Object.

Finalize—Allows an Object to attempt to free resources and perform other cleanup operations before the Object is reclaimed by garbage collection. Inherited from Object.

FindResource—Searches for a resource with the passed name and returns it Focus—Focuses the keyboard on this element. Inherited from ContentElement.

FrameworkContentElement—Create an instance of a FrameworkContentElement

GetAnimationBaseValue—If the dependency property is animated this method will give you the value as if it was not animated. Inherited from ContentElement.

GetAnimations—Retrieves an animation collection associated with a DependencyID on this element. Inherited from ContentElement.

GetBinding—Returns the Binding for the specified property.

GetHashCode—Serves as a hash function for a particular type, suitable for use in hashing algorithms and data structures like a hash table. Inherited from Object.

GetLocalValueEnumerator—Create a local value enumerator for this instance Inherited from DependencyObject.

GetRoutedEventIDs—Get RoutedEventIDs with handlers Inherited from ContentElement.

GetType—Gets the Type of the current instance. Inherited from Object.

GetValue—Retrieve the value of a property Inherited from DependencyObject.

ILogicalTreeNode.OnNewParent

ILogicalTreeNode.OnParentChanged

InvalidateProperty—Invalidates a property Inherited from DependencyObject.

MemberwiseClone—Creates a shallow copy of the current Object. Inherited from Object.

OnDelayedInvalidate—Inherited from DependencyObject during build.

OnGotFocus—An event announcing that the keyboard is focused on this element. Inherited from ContentElement.

OnGotMouseCapture—An event reporting that this element got the mouse capture. Inherited from ContentElement.

OnIsFocusedChanged—An event reporting that the IsFocused property has changed.

OnIsFocusWithinChanged—An event reporting that the IsFocusWithin property changed.

OnIsMouseCapturedChanged—An event reporting that the IsMouseCaptured property changed. Inherited from ContentElement.

OnIsMouseDirectlyOverChanged—An event reporting that the IsMouseDirectlyOver property has changed.

OnIsMouseOverChanged—An event reporting that the IsMouseOver property changed.

OnKeyDown—An event reporting a key was pressed. Inherited from ContentElement.

OnKeyUp—An event reporting a key was released. Inherited from ContentElement.

OnLostFocus—An event announcing that the keyboard is no longer focused Inherited from ContentElement.

OnLostMouseCapture—An event reporting that this element lost the mouse capture. Inherited from ContentElement.

OnMouseEnter—An event reporting the mouse entered this element. Inherited from ContentElement.

OnMouseLeave—An event reporting the mouse left this element. Inherited from ContentElement.

OnMouseLeftButtonDown—An event reporting the left mouse button was pressed. Inherited from ContentElement.

OnMouseLeftButtonUp—An event reporting the left mouse button was released. Inherited from ContentElement.

OnMouseMove—An event reporting a mouse move. Inherited from ContentElement.

OnMouseRightButtonDown—An event reporting the right mouse button was pressed. Inherited from ContentElement.

OnMouseRightButtonUp—An event reporting the right mouse button was released. Inherited from ContentElement.

OnMouseWheel—An event reporting a mouse wheel rotation. Inherited from ContentElement.

OnNewParent—Sets input parent to given new value Inherited from ContentElement.

OnPreviewGotFocus—An event announcing that the keyboard is focused on this element. Inherited from ContentElement.

OnPreviewKeyDown—An event reporting a key was pressed. Inherited from ContentElement.

OnPreviewKeyUp—An event reporting a key was released. Inherited from ContentElement.

OnPreviewLostFocus—An event announcing that the keyboard is no longer focused Inherited from ContentElement.

OnPreviewMouseEnter—When the mouse enters an element, set the cursor. We do this in a class handler, rather than overriding OnIsMouseDirectlyOverChanged, because that is a virtual which can be overridden and not called.

OnPreviewMouseLeave—An event reporting the mouse left this element. Inherited from ContentElement.

OnPreviewMouseLeftButtonDown—An event reporting the left mouse button was pressed. Inherited from ContentElement.

OnPreviewMouseLeftButtonUp—An event reporting the left mouse button was released. Inherited from ContentElement.

OnPreviewMouseMove—An event reporting a mouse move. Inherited from ContentElement.

OnPreviewMouseRightButtonDown—An event reporting the right mouse button was pressed. Inherited from ContentElement.

OnPreviewMouseRightButtonUp—An event reporting the right mouse button was released. Inherited from ContentElement.

OnPreviewMouseWheel—An event reporting a mouse wheel rotation. Inherited from ContentElement.

OnPreviewTextInput—An event announcing some text input. Inherited from ContentElement.

OnPropertyInvalidated—Notification that a specified property has been invalidated OnStyleChanged OnTextInput—An event announcing some text input. Inherited from ContentElement.

RaiseEvent—Raise routed event with the given args Inherited from ContentElement.

ReadLocalValue—Retrieve the local value of a property (if set) Inherited from DependencyObject.

ReferenceEquals—Determines whether the specified Object instances are the same instance. Inherited from Object.

ReleaseMouseCapture—Releases the mouse capture. Inherited from ContentElement.

RemoveHandler—Remove all instances of the given handler for the given RoutedEventID Inherited from ContentElement.

SetAnimations—Associates an AnimationCollection with a DependencyID on this element. Inherited from ContentElement.

SetBinding—Attaches a binding.

SetContext—Associates this UIContextObject with a UIContext. Inherited from UIContextObject.

SetResourceReference—Searches for a resource called name and sets up a resource reference to it for the passed property.

SetValue—Sets the local value of a property Inherited from DependencyObject.

ToString—Returns a String that represents the current Object. Inherited from Object.

ValidateProperty—Retrieve the value of a property (for use by native cache backed custom get accessors) Inherited from DependencyObject.

ValidatePropertyCore—Allows subclasses to participate in property value computation

```
class System.Windows.FrameworkContentElement : ContentElement :
DependencyObject : UIContextObject : Object Implements:
IInputElement
IFrameworkInputElement ILogicalTreeNode ILoaded
{
    public Void ClearAllBindings( )
    public Void ClearBinding(DependencyProperty dp)
    public Object get__DataContext( )
    public Binding GetBinding(DependencyProperty dp)
    public Void set__DataContext(Object value)
    public Binding SetBinding(DependencyProperty dp, Bind
        bind)
    public Binding SetBinding(DependencyProperty dp, String
        path)
    public Binding SetBinding(DependencyProperty dp, String
        path, BindType bindType)
    public Binding SetBinding(DependencyProperty dp, String
        path, BindType bindType,
ObjectRef source)
    public Binding SetBinding(DependencyProperty dp, String
        path, BindType bindType,
ObjectRef source, UpdateType updateType)
        public Binding SetBinding(DependencyProperty dp,
            String path,
BindType bindType, ObjectRef source, UpdateType updateType,
IDataTransformer
transformer)
        public Binding SetBinding(DependencyProperty dp,
            String path,
BindType bindType, ObjectRef source, UpdateType updateType,
IDataTransformer
transformer, CultureInfo culture)
        public Binding SetBinding(DependencyProperty dp,
            String path,
BindType bindType, ObjectRef source, UpdateType updateType,
IDataTransformer
transformer, CultureInfo culture, BindFlags bindFlags)
        public static readonlyDependencyProperty
            DataContextProperty
}
```

The base object for the Frameworks

Event Attribute Description

DataContextChanged—DataContextChanged event

GotFocus—An event announcing that the keyboard is focused on this element. Inherited from UIElement.

GotMouseCapture—An event reporting that this element got the mouse capture. Inherited from UIElement.

IsFocusedChanged—An event reporting that the IsFocused property changed. Inherited from UIElement.

IsFocusWithinChanged—An event reporting that the IsFocusWithin property changed.

IsMouseCapturedChanged—An event reporting that the IsMouseCaptured property changed. Inherited from UIElement.

IsMouseDirectlyOverChanged—An event reporting that the IsMouseDirectlyOver property changed. Inherited from UIElement.

IsMouseOverChanged—An event reporting that the IsMouseOver property changed.

KeyDown—An event reporting a key was pressed. Inherited from UIElement.

KeyUp—An event reporting a key was released. Inherited from UIElement.

Loaded—This clr event is fired when IsLoaded becomes true LostFocus—An event announcing that the keyboard is no longer focused on this element. Inherited from UIElement.

LostMouseCapture—An event reporting that this element lost the mouse capture. Inherited from UIElement.

MouseEnter—An event reporting the mouse entered this element. Inherited from UIElement.

MouseHover—An event reporting a mouse hover.

MouseLeave—An event reporting the mouse left this element. Inherited from UIElement.

MouseLeftButtonDown—An event reporting the left mouse button was pressed. Inherited from UIElement.

MouseLeftButtonUp—An event reporting the left mouse button was released. Inherited from UIElement.

MouseMove—An event reporting a mouse move. Inherited from UIElement.

MouseRightButtonDown—An event reporting the right mouse button was pressed. Inherited from UIElement.

MouseRightButtonUp—An event reporting the right mouse button was released. Inherited from UIElement.

MouseWheel—An event reporting a mouse wheel rotation. Inherited from UIElement.

PreviewGotFocus—An event announcing that the keyboard is focused on this element. Inherited from UIElement.

PreviewKeyDown—An event reporting a key was pressed. Inherited from UIElement.

PreviewKeyUp—An event reporting a key was released. Inherited from UIElement.

PreviewLostFocus—An event announcing that the keyboard is no longer focused on this element. Inherited from UIElement.

PreviewMouseEnter—An event reporting the mouse entered this element. Inherited from UIElement.

PreviewMouseHover—An event reporting a mouse hover.

PreviewMouseLeave—An event reporting the mouse left this element. Inherited from UIElement.

PreviewMouseLeftButtonDown—An event reporting the left mouse button was pressed. Inherited from UIElement.

PreviewMouseLeftButtonUp—An event reporting the left mouse button was released. Inherited from UIElement.

PreviewMouseMove—An event reporting a mouse move. Inherited from UIElement.

PreviewMouseRightButtonDown—An event reporting the right mouse button was pressed. Inherited from UIElement.

PreviewMouseRightButtonUp—An event reporting the right mouse button was released. Inherited from UIElement.

PreviewMouseWheel—An event reporting a mouse wheel rotation. Inherited from UIElement.

PreviewTextInput—An event announcing some text input. Inherited from UIElement.

TextInput—An event announcing some text input. Inherited from UIElement.

Field Description

AnimationEffectsProperty—Timeline property. Inherited from UIElement.

ClipProperty—Clip Property Inherited from UIElement.

ClipToBoundsProperty—ClipToBounds Property Inherited from UIElement.

CursorProperty—CursorProperty

DataContextProperty—DataContext DependencyProperty

FlowDirectionProperty—FlowDirectionProperty

FocusableProperty—The dependency ID for the Focusable property.

HeightProperty—HeightProperty

IDProperty—The dependency ID for the ID property.

IsEnabledProperty—The dependency ID for the IsEnabled property.

IsFocusedProperty—The dependency property for the IsFocused property. Inherited from UIElement.

IsFocusWithinProperty—The dependency property for the IsFocusWithin property.

IsMouseCapturedProperty—The dependency property for the IsMouseCaptured property. Inherited from UIElement.

IsMouseDirectlyOverProperty—The dependency property for the IsMouseDirectlyOver property. Inherited from UIElement.

IsMouseOverProperty—The dependency property for the IsMouseOver property.

MarginProperty—MarginProperty

MaxHeightProperty—MaxHeight Property

MaxWidthProperty—MaxWidth Property

MinHeightProperty—MinHeight Property

MinWidthProperty—MinWidth Property

OpacityProperty—The Opacity property. Inherited from UIElement.

StyleProperty—Style Dependency Property

TimelineProperty—Timeline property. Inherited from UIElement.

VisibilityProperty—The Visibility property. Inherited from UIElement.

WidthProperty—Width Property

Method Description

AddHandler—See overloaded method for details Inherited from UIElement.

AdjustEventSource—Allows adjustment to the event source Inherited from UIElement.

Arrange—Parents or system call this method to arrange the internals of children on a second pass of layout update. Inherited from UIElement.

ArrangeChildHelper—The helper method for a parent to call instead of Arrange on a child during layout. Reads Width, Height, Min/MaxWidth, Min/MaxHeight from the child, uses reference size to resolve percent values and calls Arrange method on a child with modified arrangeSize.

ArrangeCore—ArrangeCore allows for the customization of the positioning of children. Inherited from UIElement.

BuildRoute—Builds the EventRoute Inherited from UIElement.

BuildRouteCore—Allows FrameworkElement to augment the EventRoute

CaptureMouse—Captures the mouse to this element. Inherited from UIElement.

ClearAllBindings—Removes all bindings attached to the element.

ClearBinding—Removes the binding attached to the specified DependencyProperty.

ClearValue—Clears the local value of a property Inherited from DependencyObject.

DeferLoad—This purpose of this method as the name indicates is to defer the firing of the Loaded event EndDeferLoad—This call is meant to match a prior DeferLoad call, thereby cause Loaded event to be fired if there are no more pending EndDeferLoad calls.

EnsureVisuals—Build the current Style's VisualTree Equals—Determines whether two Object instances are equal. Inherited from Object.

Finalize—Releases all resources held by the Visual object. Inherited from Visual.

FindResource—Searches for a resource with the passed name and returns it Focus—Focuses the keyboard on this element. Inherited from UIElement.

FrameworkElement—Default DependencyObject constructor GetAnimationBaseValue—If the dependency property is animated this method will give you the value as if it was not animated. Inherited from UIElement.

GetAnimations—Retrieves an animation collection associated with a DependencyID on this element. Inherited from UIElement.

GetAutomationProvider—Called by the Automation infrastructure to request a provider object to provide additional properties for this element.

GetBinding—Returns the Binding for the specified property.

GetHashCode—Serves as a hash function for a particular type, suitable for use in hashing algorithms and data structures like a hash table. Inherited from Object.

GetLocalValueEnumerator—Create a local value enumerator for this instance Inherited from DependencyObject.

GetRoutedEventIDs—Get RoutedEventIDs with handlers Inherited from UIElement.

GetType—Gets the Type of the current instance. Inherited from Object.

GetValue—Retrieve the value of a property Inherited from DependencyObject.

HitTestCore—HitTestCore implements precise hit testing against render contents Inherited from RetainedVisual.

IDragDrop.OnDragEnter

IDragDrop.OnDragLeave

IDragDrop.OnDragOver

IDragDrop.OnDrop

IDragDrop.OnGiveFeedback

IDragDrop.OnQueryContinueDrag

ILogicalTreeNode.OnNewParent

ILogicalTreeNode.OnParentChanged

InvalidateArrange—Invalidates the arrange state for the element. The element will be queued for an update layout that will occur asynchronously.

MeasureCore will not be called unless InvalidateMeasure is also called—or that something else caused the measure state to be invalidated. Inherited from UIElement.

InvalidateMeasure—Invalidates the measurement state for the element. This has the effect of also invalidating the arrange state for the element. The element will be queued for an update layout that will occur asynchronously. Inherited from UIElement.

InvalidateProperty—Invalidates a property Inherited from DependencyObject.

InvalidateVisual—InvalidateVisual. Inherited from RetainedVisual.

IRetainedRender.Render—Inherited from UIElement.

IVisual.FindCommonVisualAncestor—Inherited from Visual.

IVisual.HitTest—Inherited from Visual.

IVisual.IsAncestorOf—Inherited from Visual.

IVisual.IsDescendantOf—Inherited from Visual.

IVisual.TransformFromAncestor—Inherited from Visual.

IVisual.TransformFromDescendant—Inherited from Visual.

IVisual.TransformFromVisual—Inherited from Visual.

IVisual.TransformToAncestor—Inherited from Visual.

IVisual.TransformToDescendant—Inherited from Visual.

IVisual.TransformToVisual—Inherited from Visual.

Measure Updates DesiredSize of the UIElement. Must typically be called by parents from theor MeasureCore, to form recursive update. This is first pass of layout update. Inherited from UIElement.

MeasureChildHelper The helper method for a parent to call instead of Measure on a child during layout. Reads Width, Height, Min/MaxWidth, Min/MaxHeight from the child, uses reference size to resolve percent values and calls Measure method on a child with correct constraint. Aslo 'clamps' child's desired size using specified sizing properties.

MeasureCore Measurement override. Implement your size-to-content logic here. Inherited from UIElement.

MemberwiseClone Creates a shallow copy of the current Object. Inherited from Object.

OnAccessKey The access key for this element was invoked. Base implementation sets focus to the element. Inherited from UIElement.

OnChildDesiredSizeChanged Notification that is called by Measure of a child when it ends up with different desired size for the child. Inherited from UIElement.

OnDelayedInvalidate Inherited from DependencyObject in build.

OnGotFocus An event announcing that the keyboard is focused on this element. Inherited from UIElement.

OnGotMouseCapture An event reporting that this element got the mouse capture. Inherited from UIElement.

OnIsFocusedChanged An event reporting that the IsFocused property has changed.

OnIsFocusWithinChanged An event reporting that the IsFocusWithin property changed.

OnIsMouseCapturedChanged An event reporting that the IsMouseCaptured property changed. Inherited from UIElement.

OnIsMouseDirectlyOverChanged An event reporting that the IsMouseDirectlyOver property has changed.

OnIsMouseOverChanged An event reporting that the IsMouseOver property changed.

OnKeyDown An event reporting a key was pressed. Inherited from UIElement.

OnKeyUp An event reporting a key was released. Inherited from UIElement.

OnLostFocus An event announcing that the keyboard is no longer focused Inherited from UIElement.

OnLostMouseCapture An event reporting that this element lost the mouse capture. Inherited from UIElement.

OnMouseEnter An event reporting the mouse entered this element. Inherited from UIElement.

OnMouseLeave An event reporting the mouse left this element. Inherited from UIElement.

OnMouseLeftButtonDown An event reporting the left mouse button was pressed. Inherited from UIElement.

OnMouseLeftButtonUp An event reporting the left mouse button was released. Inherited from UIElement.

OnMouseMove An event reporting a mouse move. Inherited from UIElement.

OnMouseRightButtonDown An event reporting the right mouse button was pressed. Inherited from UIElement.

OnMouseRightButtonUp An event reporting the right mouse button was released. Inherited from UIElement.

OnMouseWheel An event reporting a mouse wheel rotation. Inherited from UIElement.

OnPreviewGotFocus An event announcing that the keyboard is focused on this element. Inherited from UIElement.

OnPreviewKeyDown An event reporting a key was pressed. Inherited from UIElement.

OnPreviewKeyUp An event reporting a key was released. Inherited from UIElement.

OnPreviewLostFocus An event announcing that the keyboard is no longer focused Inherited from UIElement.

OnPreviewMouseEnter When the mouse enters an element, set the cursor. We do this in a class handler, rather than overriding OnIsMouseDirectlyOverChanged, because that is a virtual which can be overridden and not called.

OnPreviewMouseLeave An event reporting the mouse left this element. Inherited from UIElement.

OnPreviewMouseLeftButtonDown An event reporting the left mouse button was pressed. Inherited from UIElement.

OnPreviewMouseLeftButtonUp An event reporting the left mouse button was released. Inherited from UIElement.

OnPreviewMouseMove An event reporting a mouse move. Inherited from UIElement.

OnPreviewMouseRightButtonDown An event reporting the right mouse button was pressed. Inherited from UIElement.

OnPreviewMouseRightButtonUp An event reporting the right mouse button was released. Inherited from UIElement.

OnPreviewMouseWheel An event reporting a mouse wheel rotation. Inherited from UIElement.

OnPreviewTextInput An event announcing some text input. Inherited from UIElement.

OnPropertyInvalidated Notification that a specified property has been invalidated OnRender Render callback. Inherited from UIElement.

OnStyleChanged Style has changed

OnTextInput An event announcing some text input. Inherited from UIElement.

RaiseCommand RaiseCommand Inherited from UIElement.

RaiseEvent Raise the events specified by RoutedEventID Inherited from UIElement.

RaiseQueryStatus RaiseQueryStatus Inherited from UIElement.

ReadLocalValue Retrieve the local value of a property (if set) Inherited from DependencyObject.

ReferenceEquals Determines whether the specified Object instances are the same instance. Inherited from Object.

ReleaseMouseCapture Releases the mouse capture. Inherited from UIElement.

RemoveHandler Removes all instances of the specified routed event handler for this object instance Inherited from UIElement.

RenderOpen RendeOpen opens the RetainedVisual for rendering. Inherited from RetainedVisual.

SetAnimations Associates an AnimationCollection with a DependencyID on this element. Inherited from UIElement.

SetBinding Attaches a binding.

SetContext Associates this UIContextObject with a UIContext. Inherited from UIContextObject.

SetResourceReference Searches for a resource called name and sets up a resource reference to it for the passed property.

SetValue Sets the local value of a property Inherited from DependencyObject.

ToString Returns a String that represents the current Object. Inherited from Object.

TraverseFocus Request to move the focus from this element to another element

UpdateLayout Call this method to ensure that the whole subtree of elements that includes this UIElement is properly updated. Inherited from UIElement.

ValidateProperty Retrieve the value of a property (for use by native cache backed custom get accessors) Inherited from DependencyObject.

ValidatePropertyCore Allows subclasses to participate in property value computation Property Attribute Description AnimationEffects—The collection of AnimationEffect attached to this element. Inherited from UIElement.

Clip—Clip Property Inherited from UIElement.

ClipToBounds—ClipToBounds Property Inherited from UIElement.

CommandLinks—CommandLinks Inherited from UIElement.

ComputedSize—Returns the actual size of the element. Inherited from UIElement.

ContentOwner—ContentOwner is the ItemsControl whose items produce the content for the current element. This property can only be set in the chrome template for an ItemsControl—it identifies the location in the template where the ItemsControl should place the UI generated for its items.

Context—Returns the UIContext that this UIContextObject is associated with. Inherited from UIContextObject.

Cursor—Cursor Property

DataContext—Gets or sets the data context for an element.

DependencyObjectType—Returns the DType that represents the CLR type of this instance Inherited from DependencyObject.

DesiredSize—Returns the size the element computed during the Measure pass. This is only valid if IsMeasureValid is true. Inherited from UIElement.

FlowDirection—FlowDirection Property

Focusable—Gettor and Settor for Focusable Property

ForwardCommandsTo—CommandLinks Inherited from UIElement.

HasAnimations—Determines if any animations are present on this element Inherited from UIElement.

Height—Gets or sets the height of the element.

HitTestBounds—HitBounds returns the hit region bounding box for the current visual. Inherited from Visual.

ID—ID property.

IsArrangeValid—Determines if the ComputedSize and position of child elements is valid. Inherited from UIElement.

IsDisposed—Gets a value that indicates whether the system has disposed of the Visual. Inherited from Visual.

IsEnabled—A property indicating if this element is enabled or not.

IsFocused—A property indicating if the keyboard is focused on this element or not. Inherited from UIElement.

IsFocusWithin—Indicates if Keyboard Focus is anywhere within in the subtree starting at the current instance IsLoaded—Read-only property that tells you if or not the current element has been loaded IsMeasureValid—Determines if the DesiredSize is valid. Inherited from UIElement.

IsMouseCaptured—A property indicating if the mouse is captured to this element or not. Inherited from UIElement.

IsMouseDirectlyOver—A property indicating if the mouse is over this element or not. Inherited from UIElement.

IsMouseOver—A property indicating if the mouse is over this element or not.

IsRequestingAnimationBaseValue—This property will return true while the class is calculating the animation base value requested by a call to GetAnimationBaseValue( ). Inherited from UIElement.

IsTreeSeparator—Indicates if the current instance is at the root of a separate tree KeyboardActive—Gettor and Settor for KeyboardActive Property Margin—Margin Property MaxHeight—MaxHeight Property MaxWidth—MaxWidth Property MinHeight—MinHeight Property MinWidth—MinWidth Property Opacity—Opacity accessor Inherited from UIElement.

Parent—Returns logical parent

RenderBounds—This property is only used if the RetainedVisual implements RetainedRender. If not this property will throw an InvalidOperationException. The implementer must typically set this property to the bounds of the ink drawn by his Render function in local coordinate space. Inherited from RetainedVisual.

Resources—Current locally defined Resources

Style—Style property

Timeline—Timeline accessor. Inherited from UIElement.

Visibility—Visibility accessor Inherited from UIElement.

Width—Gets or sets the width of the element.

```
class System.Windows.FrameworkElement : UIElement :
RetainedVisual : Visual :
DependencyObject : UIContextObject : Object
            Implements: IVisual IRetainedRender IInputElement
            ICommandTarget
IFrameworkInputElement ILogicalTreeNode IDragDrop ILoaded
    {
    public Void ClearAllBindings( )
    public Void ClearBinding(DependencyProperty dp)
    public Object get_DataContext( )
    public Binding GetBinding(DependencyProperty dp)
    public Void set_DataContext(Object value)
    public Binding SetBinding(DependencyProperty dp, Bind bind)
    public Binding SetBinding(DependencyProperty dp, String
    path)
    public Binding SetBinding(DependencyProperty dp, String
    path, BindType bindType)
    public Binding SetBinding(DependencyProperty dp, String
    path, BindType bindType,
ObjectRef source)
    public Binding SetBinding(DependencyProperty dp, String
    path, BindType bindType,
ObjectRef source, UpdateType updateType)
            public Binding SetBinding(DependencyProperty dp,
                String path,
BindType bindType, ObjectRef source, UpdateType updateType,
IDataTransformer
transformer)
            public Binding SetBinding(DependencyProperty dp,
                String path,
BindType bindType, ObjectRef source, UpdateType updateType,
IDataTransformer
transformer, CultureInfo culture)
            public Binding SetBinding(DependencyProperty dp,
                String path,
BindType bindType, ObjectRef source, UpdateType updateType,
IDataTransformer
transformer, CultureInfo culture, BindFlags bindFlags)
                public static readonlyDependencyProperty
                    DataContextProperty
}
```

Templating instance representation

Method Description

AliasProperty—Set up a binding between a template child and the styled container AppendChild—Add a factory child to this factory CreateInstance—Create an instance of the specified type Equals—Determines whether two Object instances are equal. Inherited from Object.

Finalize—Allows an Object to attempt to free resources and perform other cleanup operations before the Object is reclaimed by garbage collection. Inherited from Object.

FrameworkElementFactory—Construction

GetHashCode—Serves as a hash function for a particular type, suitable for use in hashing algorithms and data structures like a hash table. Inherited from Object.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

SetBinding—Creates an initial binding in the factory's template children.

SetValue—Simple value set on template child

ToString—Returns a String that represents the current Object. Inherited from Object.

Property Description

FirstChild—First child factory

IsSealed—FrameworkElementFactory mutability state

NextSibling—Next sibling factory

Parent—Parent factory

StyleID—Style identifier

Type—Type of object that the factory will produce

```
class System.Windows.FrameworkElementFactory : Object
{
    public Void SetBinding(DependencyProperty dp, Bind
    bind)
}
class System.Windows.FrameworkPropertyMetadata :
PropertyMetadata : Object
{
    public Boolean get_Databindable( )
    public Void set_Databindable(Boolean value)
}
enum sealed System.Windows.MetadataFlags : Enum :
ValueType : Object
Implements: IComparable IFormattable IConvertible
{
        public static MetadataFlags NoDatabind
}
abstract interface System.Windows.IApplyValue
{
    public virtual Void Apply(DependencyObject e,
    DependencyProperty dp)
}
```

An abstract class, used as the base class for several other provided "Avalon" classes that manage a view of a data collection.

CollectionChanged—Occurs when the collection view changes. This could mean that items were added or removed in the collection, or that a new sort or filter was applied to this view.

ProtectedCurrentChanged—A protected event. In derived classes, this event occurs after changing the position of the record pointer.

ProtectedCurrentChanging—A protected event. In derived classes, this event occurs before a change in currency. If necessary, handlers of the event can cancel the change.

Method Description

ChangedCurrent—Raises the implemented CurrentChanged event of the object.

CollectionView—Initializes a new instance of a CollectionView derived class. This constructor is protected in the base CollectionView class.

Contains—Determines whether a given data item belongs to this collection view.

ContainsItem—Determines whether a given data item belongs to this collection view or the unfiltered collection.

Equals—Determines whether two Object instances are equal. Inherited from Object.

Finalize—Allows an Object to attempt to free resources and perform other cleanup operations before the Object is reclaimed by garbage collection. Inherited from Object.

GetEnumerator—Returns an enumerator that can iterate through the collection view.

GetHashCode—Serves as a hash function for a particular type, suitable for use in hashing algorithms and data structures like a hash table. Inherited from Object.

GetType—Gets the Type of the current instance. Inherited from Object.

IndexOf—Returns the index where the given data item belongs in the collection, or −1 if the index of that item is unknown.

MemberwiseClone—Creates a shallow copy of the current Object. Inherited from Object.

OKToChangeCurrent—Determines whether it is allowable to change the position of the current record pointer.

OnCollectionChanged—Implement this method to handle CollectionChanged events in the data collection that underlies the collection view.

ReferenceEquals—Determines whether the specified Object instances are the same instance. Inherited from Object.

Refresh—Refreshes the view. Reapplies any current sort or filter conditions, as set by various properties that declare sort or filter criteria.

ToString—Returns a String that represents the current Object. Inherited from Object.

```
abstract class System.ComponentModel.CollectionView : Object
Implements:
IEnumerable ICollectionChange
{
    protected Void ChangedCurrent( )
    public virtual Boolean Contains(Object item)
    public virtual Boolean ContainsItem(Object item)
    public virtual Boolean get_CanFilter( )
    public virtual Boolean get_CanSort( )
    public ICollection get_Collection( )
    public virtual IComparer get_Comparer( )
    public virtual Int32 get_Count( )
    public virtual ICurrentItem get_CurrentItem( )
    public virtual String get_Filter( )
    public virtual SortDescription[ ] get_Sort( )
    public Object get_ViewManagerData( )
    public virtual IEnumerator GetEnumerator( )
    public virtual Int32 IndexOf(Object item)
    protected Boolean OKToChangeCurrent( )
    protected virtual Void OnCollectionChanged(Object sender,
CollectionChangeEventArgs args)
    public virtual Void Refresh( )
    public virtual Void set_Filter(String value)
    public virtual Void set_Sort(SortDescription[ ] value)
    public Void set_ViewManagerData(Object value)
}
```

Represents the method that handles the CurrentChanged event raised by collection views, or any class implementing the ICurrentItem interface.

```
Parameters
    sender System.Object.View that is proposing to
    change current item.
    args System.EventArgs.Event arguments.
    Return Value System.Void.
class sealed System.ComponentModel.CurrentChangedEventHandler :
MulticastDelegate : Delegate : Object Implements: ICloneable
ISerializable
{
    public virtual IAsyncResult BeginInvoke(Object sender,
        EventArgs args,
AsyncCallback callback, Object object)
    public virtual Void EndInvoke(IAsyncResult result)
    public virtual Void Invoke(Object sender, EventArgs args)
}
```

Represents the method that handles the CurrentChanging event raised by collection view classes, or any class implementing the ICurrentItem interface.

Parameters sender—System.Object. The collection view Object that is changing currency. This will be an instance of CollectionView a derived class, or a class implementing ICurrentItem.

args—System.ComponentModel.CancelEventArgs.

Arguments of the event, as an instance of CancelEventArgs.

Return Value System.Void.

This event is invoked immediately before the current record pointer moves in this view. The Cancel property in the event arguments can be used to cancel the proposed move, and this convention should be respected by the currency logic in custom collection views. See ProtectedCurrentChanging for an example.

CollectionView is an abstract class. The event might be more properly understood by looking at actual derivations of the class, such as ListCollectionView and ArrayListCollectionView. In these classes the event does not include the "Protected" prefix.

```
class sealed System.ComponentModel.CurrentChangingEventHandler :
MulticastDelegate : Delegate : Object Implements: ICloneable
ISerializable
{
    public virtual IAsyncResult BeginInvoke(Object sender,
        CancelEventArgs args,
AsyncCallback callback, Object object)
    public virtual Void EndInvoke(IAsyncResult result)
    public virtual Void Invoke(Object sender, CancelEventArgs
        args)
}
        Enables notifications that items within a collection have
            changed: an
item has been added, removed, or the entire collection has been
refreshed.
        Event Description
            CollectionChanged - Occurs if the collection has changed
                its content.
Arguments of the event specify the change that has taken place.
        This interface is implemented by the
            ArrayListDataCollection data
collection class.
abstract interface System.ComponentModel.ICollectionChange
{
}
```

An interface used to create collection view factory classes, which in turn create new CollectionView derived objects.

Method Description

CreateView—Creates a new view on the collection that implements this interface. Normally, this method is only called by a view manager, not by user code.

Normally, user code does not call methods on this interface. The common way to obtain a view over a collection is to call GetView.

```
abstract interface System.ComponentModel.ICollectionViewFactory
{
    public virtual CollectionView CreateView( )
}
```

Maintains the concept of the current record pointer in a collection view.

Event Description

CurrentChanged—Occurs immediately after changing the position of the current record pointer within the collection view.

CurrentChanging—Occurs immediately before changing the position of the current record pointer within the collection view. Handlers to the event should have the opportunity to cancel the position move by using the Cancel property of the returned arguments class to cancel the move.

Method Description

MoveFirst—Moves the record pointer to the first record in the collection view.

MoveLast—Moves the record pointer to the last record in the collection view.

MoveNext—Moves the record pointer to the next record in the collection view.

MovePrevious—Moves the record pointer to the previous record in the collection view.

MoveTo—Moves the record pointer to the specified record in the collection view.

Property Description

BOF—Gets the Boolean value that declares whether the record pointer is at or before the beginning of the collection array.

Current—Gets the current record located at the current record pointer position.

EOF—Gets a Boolean value that declares whether the record pointer is at or beyond the end of the collection array.

Remarks

ArrayListCollectionView implements this interface indirectly, as do several other provided collection view classes.

To access methods of ICurrentItem in collection views, get the CurrentItem object in the view. This object supports ICurrentItem and thus enables changing the current record position.

By choosing to not implement this interface, very simple collection views can choose not to support currency, but this is not recommended.

How Do I Navigate Through the Objects in a Data Collection View?

You can navigate through the objects in a data collection view by using the methods provided in view classes that inherit the ICurrentItem interface. Although the methods and properties involved are not direct members of the view classes, you can call these methods by returning the CurrentItem object and calling the various ICurrentItem collection navigation methods on it. In most cases, implementations of collection views derive from CollectionView and inherit from ICurrentItem. There are several methods defined by ICurrentItem that are used for navigating the objects in the collection.

| |
|---|
| MoveFirst |
| MoveLast |
| MoveNext |
| MovePrevious |
| MoveTo |

MoveFirst and MoveLast take you to the first or last objects in the collection, respectively. MoveNext and MovePrevious take you to the next or previous objects in the collection, relative to the Current object. MoveTo accepts an object argument and moves the current record pointer to that object's record if it could be found. In addition to attempting the desired move, these methods return Boolean values that inform you whether the record pointer is now on an item that exists in the current view (this distinction comes into play if you are viewing a collection with a filter applied).

In this C# example, the same function handles button clicks from either a Previous or Next button. MyCollectionView is a view that is an instance of CollectionView. This is the base view class that implements the ICurrentItem interface. Most common view operations can be handled with this base class, rather than choosing to cast the initially returned view to the more specialized view classes ListCollectionView, BindingListCollectionView, or ArrayListCollectionView.

```
public void OnButton(Object sender, ClickEventArgs args)
{
    Button b = sender as Button;
    switch(b.ID)
    {
    case "Previous":
        MyCollectionView.CurrentItem.MovePrevious( );
        if(!MyCollectionView.CurrentItem.BOF)
        {
            FeedbackText.Text = "";
            o = MyCollectionView.CurrentItem.Current
                as Order;
            myListBox.SelectedIndex =
                MyCollectionView.IndexOf(o);
        }
        else
        {
            MyCollectionView.CurrentItem.MoveFirst( );
            FeedbackText.Text = "At first record";
        }
        break;
    case "Next":
        MyCollectionView.CurrentItem.MoveNext( );
        if(!MyCollectionView.CurrentItem.EOF)
        {
            FeedbackText.Text = "";
            o = MyCollectionView.CurrentItem.Current
                as Order;
            myListBox.SelectedIndex =
                MyCollectionView.IndexOf(o);
        }
        else
        {
            MyCollectionView.CurrentItem.MoveLast( );
            FeedbackText.Text = "At last record";
        }
        break;
    }
}
abstract interface System.ComponentModel.ICurrentItem
{
    public virtual Boolean get__BOF( )
    public virtual Object get__Current( )
    public virtual Boolean get__EOF( )
    public virtual Boolean MoveFirst( )
    public virtual Boolean MoveLast( )
```

-continued

```
    public virtual Boolean MoveNext( )
    public virtual Boolean MovePrevious( )
    public virtual Boolean MoveTo(Object item)
}
```

Create a One-Way Binding to a Dynamically Updated Data Source

Classes that implement this interface can update the bound target property whenever the source property changes.

Event Description

PropertyChanged—Occurs whenever a property of a data item class changes.

Events

How Do I Implement Property Change Notification?

This example shows how to provide for property change notification in your data items by implementing the IPropertyChange interface.

You can bind user interface (UI) presentation elements to data items with One-Time binding. The UI will then reflect the initial value of the data item but will not automatically reflect changes in that underlying data item. "Avalon" also supports One-Way and Two-Way binding. In One-Way binding the target of the binding responds automatically to changes in a source data item. To bind so that changes in your source data item are automatically reflected in your binding target, you must typically add code to support property change notifications. You do this by deriving your source data item class from IPropertyChange and then declaring the PropertyChanged event as a PropertyChangedEventHandler delegate. Declaring the event is how you implement the IPropertyChange interface on your data item. Within the data item you then define your own notification method containing program logic that eventually raises the event by calling back through its event handler. You typically call your notification method within the set method of your data item property when you determine that the data value of the property has changed. The set method of your property is called when the property is assigned a value by outside users of your data item.

In the following code, the data item is declared as a NumberListItem class that derives from IPropertyChange. Though other properties of the data item could be exposed, in this example one property, NLValue, is exposed as sufficient for this class. In compliance with the IPropertyChange interface contract, the class also exposes the public event PropertyChanged. A private NotifyPropertyChanged method is used internally as the method to call for notification. It accepts the name of an exposed property as a string, in this case NLValue. Within the notification method the event condition is raised by calling the event handler through the declared event. Of course, as a precaution against a null reference exception, the callback is only attempted if the event has been assigned a non-null reference to an event handler. That assignment is normally done by the system ahead of time when objects of this data item class are instantiated. The callback invocation of the event handler also accepts the name of the property, but only if that name is enveloped within a PropertyChangedEventArgs object that is created anew for this purpose. To complete the notification support, within the set method of the property a call to the private NotifyPropertyChanged method is done when a change in the value of the property is detected. Both the value assignment and the notification are done only if the new value passed to the set method is different than the current value of the property, _NLValue.

For C#, here is the declaration of the data item class.

```
public class NumberListItem : IPropertyChange
{
    private int _NLValue = 0;
    static NumberListItem( )
    {
    }
    public int NLValue
    {
        get
        {
            return _NLValue;
        }
        set
        {
            if (_NLValue != value)
            {
                _NLValue = value;
                NotifyPropertyChanged("NLValue");
            }
        }
    }
    // The following variable and method provide the support for
    // handling property change notifications.
    public event PropertyChangedEventHandler PropertyChanged;
    private void NotifyPropertyChanged(String info)
    {
        if (PropertyChanged != null)
            PropertyChanged(this, new
              PropertyChangedEventArgs(info));
    }
}
```

For Microsoft® Visual Basic® .NET, here is the declaration of the data item class.

```
Public Class NumberListItem
    Implements IPropertyChange
    Private _NLValue As Integer = 0
    Shared Sub New( )
    End Sub 'New
```

'The following event and method provide the support for 'handling property change notifications.

Public Event PropertyChanged As PropertyChangedEventHandler Implements IPropertyChange.PropertyChanged

```
Private Sub NotifyPropertyChanged(ByVal info As String)
    RaiseEvent PropertyChanged(Me, New
      PropertyChangedEventArgs(info))
End Sub 'NotifyPropertyChanged
Public Property NLValue( ) As Integer
    Get
        Return _NLValue
    End Get
    Set
        If _NLValue < > value Then
            _NLValue = value
            NotifyPropertyChanged("NLValue")
        End If
    End Set
End Property
End Class 'NumberListItem
```
Create a One-Way Binding to a Dynamically Updated Data Source This example shows how binding to a data object where PropertyChanged is implemented with a one-way binding will refresh the bound properties in a control whenever the data changes.

For most bindings, you want to use either a one-way or two-way binding, so that the destination element reflects data changes in the bound source property. If you want these updates to happen automatically as intended, it is an absolute requirement that the individual data properties each raise the PropertyChanged event upon an internal change in their value, and, therefore, either the overall data class or the individual items in a data collection must typically implement IPropertyChange.

The C# example shown here is the complete code for a data class and includes an internal timer loop that produces real-time changes in the underlying data properties. This scenario is similar to implementing a "stock ticker" in a Web page, where the application is consuming data that could change at any time, but not necessarily writing back to the source.

```
using System;
using System.ComponentModel;
using System.Windows;
using System.Windows.Controls;
using System.ComponentModel;
using System.Windows.Data;
namespace WCPSample {
    public class myDataCollection: ArrayListDataCollection
    {
        public myDataCollection_changeThis;
        public myData item1 = new myData("Ichiro
Bobblehead",(decimal)24.95);
        public myData item2 = new myData("Edgar Toy
Duck",(decimal)
16.05);
        public myData item3 = new myData("Jeff Cirillo
Golden
Sombero", (decimal) 0.99);
        public myDataCollection( ):base( )
        {
            Add(item1);
            Add(item2);
            Add(item3);
            CreateTimer( );
        }
        private void CreateTimer( )
        {
            System.Timers.Timer Timer1 = new
System.Timers.Timer( );
            Timer1.Enabled = true;
            Timer1.Interval = 10000;
            Timer1.Elapsed += new
System.Timers.ElapsedEventHandler(Timer1_Elapsed);
        }
        private void Timer1_Elapsed(object sender,
System.Timers.ElapsedEventArgs e)
        {
            item1.BidItemPrice += (decimal) 1.10;
            item2.BidItemPrice += (decimal) 0.40;
        }
    }
    public class myData: IPropertyChange
    {
        private string_biditemname = "Unset";
        private decimal_biditemprice = (decimal) 0.0;
        public myData(string NewBidItemName, decimal
NewBidItemPrice) {
            _biditemname = NewBidItemName;
            _biditemprice = NewBidItemPrice;
        }
        public string BidItemName
        {
            get
            {
                return_biditemname;
```

```
        }
        set
        {
            if(_biditemname.Equals(value) = = false)
            {
                _biditemname = value;
                //Call Notify PropertyChanged
                whenever the property is
    updated
                NotifyPropertyChanged("BidItemName");
            }
        }
    }
    public decimal BidItemPrice
    {
        get
        {
            return_biditemprice;
        }
        set
        {
            if(_biditemprice.Equals(value) = = false)
            {
                _biditemprice = value;
                //Call Notify PropertyChanged
                whenever the property is
    updated
                NotifyPropertyChanged("BidItemPrice");
            }
        }
    }
    //Declare event
    public event PropertyChangedEventHandler
PropertyChanged;
    //NotifyPropertyChanged event handler to update
    property value in
binding
    private void NotifyPropertyChanged(string
propName)
    {
        if (PropertyChanged !=null)
        {
            PropertyChanged(this, new
PropertyChangedEventArgs(propName));
        }
    }
    }
}
abstract interface System.ComponentModel.IPropertyChange
{
}
```

Describes a sort qualifier that is used to sort items in a collection when creating a view. An array of these qualifier descriptions is used to set the Sort property of a collection view.

Method Description

Equals—Indicates whether this instance and a specified object are equal. Inherited from ValueType.

Finalize—Allows an Object to attempt to free resources and perform other cleanup operations before the Object is reclaimed by garbage collection. Inherited from Object.

GetHashCode—Returns the hash code for this instance. Inherited from ValueType.

GetType—Gets the Type of the current instance. Inherited from Object.

MemberwiseClone—Creates a shallow copy of the current Object. Inherited from Object.

ReferenceEquals—Determines whether the specified Object instances are the same instance. Inherited from Object.

SortDescription—Initializes a new instance of a SortDescription structure.

ToString—Returns the fully qualified type name of this instance. Inherited from ValueType.

Property Description

Direction—Gets the sort direction value declared in this sort direction item.

Empty—Represents an empty sort description array. This method is intended to be called statically.

PropertyName—Gets the property name declared by this sort direction item. This property should be exposed as public in the underlying collection.

How Do I Sort Data?

This example describes how to sort data in a data collection view. A data collection is a group of data of type IEnumerable, where members of the collection implement IProperty-Change and the collection itself implements ICollection-Change. A data collection view is one possible view of that collection, where additional conditions such as sorting and filtering can be applied to the collection, but these views leave the underlying collection unchanged.

To sort the data, set the Sort property on any view class derived from CollectionView. This property is set to an array of SortDescription structures. Each structure describes one property of the data that should be the property sorted upon, and the sort direction. Items in the array of these structures are handled sequentially when the sort is performed.

The following C# example sorts the data in ascending order. Each member of the collection is an Order object and is sorted by the sequence of the order property in the data. MyALCollectionView is an ArrayListCollectionView object obtained from the collection, and sdA is the array of sort descriptions.

```
sdA[0] = new
SortDescription("order",ListSortDirection.Ascending);
MyALCollectionView.Sort = sdA;
```

You also call Refresh on the view to have the sort order take effect.

MyALCollectionView.Refresh( );

Note: Alternatively, if you are using one of the collection types provided by "Avalon", you can use the custom sort methods on its matching collection view. For instance, if your data collection is based on ListCollectionView, you can use ListCollectionView.CustomSort. This approach is not discussed here.

```
struct sealed System.ComponentModel.SortDescription :
ValueType : Object
{
    public ListSortDirection get_Direction( )
    public static SortDescription[ ] get_Empty( )
    public String get_PropertyName( )
}
```

Thus, as described, the present invention provides a mechanism for associating a source data value with a target property in such a manner that changes in the coding of the user interface and the logic may be de-coupled. Thus, the present invention allows developers to easily modify and enhance the user interface without requiring them to modify the underlying logic of the application.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method, comprising:
receiving at least one parameter; and
in response to receiving the at least one parameter,
performing an operation relating to a binding in an application on at least one property from at least one of: data sources, data source classes, and data-specific implementations of collections and views;
wherein the application comprises a user interface portion that includes user interface elements that each comprise one or more target properties and a logic portion that is configured to manipulate a source data value;
wherein the binding associates the one target property with the source data value;
wherein the binding is associated with a binding object that specifies binding properties comprising: a path indicating a manner to which to locate the source data value, a binding type comprising: a one way binding type that is used to update a non-editable property associated with the user interface; a two way binding type that is used to update an editable property associated with the user interface when the source data value changes and update the source data value when the editable property change; and an update type that specifies when updates are to occur.

2. The method of claim 1, wherein performing the operation, further comprises performing handling collection changed events in data collection underlying a collection view.

3. The method of claim 1, wherein performing the operation, further comprises performing a function relating to array list data collection.

4. The method of claim 3, wherein performing the function relating to the array list data collection, further comprises performing at least one of the functions within a set comprising: adding, clearing, creating a view, inserting, removing, reversing, setting a range, and sorting.

5. The method of claim 1, wherein performing the operation, further comprises managing bindings.

6. The method of claim 1, wherein performing the operation, further comprises getting a bind declaration object of a binding expression.

7. The method of claim 1, wherein performing the operation, further comprises performing a collection view function.

8. The method of claim 1, wherein performing the operation, further comprises implementing a collection view that includes checks for context infinity.

9. The method of claim 1, wherein performing the operation, further comprises supporting object references to objects being used as data context for a binding.

10. The method of claim 1, wherein performing the operation, further comprises encapsulating arguments for data transfer events, wherein the events are routed events that are handled by a designated handler based on a delegate.

11. The method of claim 1, wherein performing the operation, further comprises handling a data transfer event raised by a binding.

12. The method of claim 1, wherein performing the operation, further comprises representing an object reference to an element, with the object reference being specified by its element ID.

13. The method of claim 12, wherein the object reference is an explicit object reference.

14. The method of claim 1, wherein performing the operation, further comprises implementing a collection view for collections based on a list.

15. The method of claim 1, wherein performing the operation, further comprises serving as a data source for data binding.

16. The method of claim 1, wherein performing the operation, further comprises holding a collection of named parameters.

17. The method of claim 1, wherein performing the operation, further comprises representing a single select statement to be submitted to a database.

18. The method of claim 1, wherein performing the operation, further comprises encapsulating arguments passed in an event relating to at least one of an ObjectDataSource, and a RefreshCompleted event of an XmlDataSource.

19. The method of claim 1, wherein performing the operation, further comprises handling events relating to at least one of a ObjectDataSource.RefreshCompleted event and a XmlDataSource.RefreshCompleted event.

20. The method of claim 1, wherein performing the operation, further comprises receiving a list of sql commands and names of tables.

21. The method of claim 1, wherein performing the operation, further comprises getting data from a SQL Server for use in databinding.

22. The method of claim 1, wherein performing the operation, further comprises allowing resource reference to a transformer class that is defined as code-behind in a current application.

23. The method of claim 1, wherein performing the operation, further comprises declaring namespaces to be used in Xml data binding XPath queries.

24. The method of claim 1, wherein performing the operation, further comprises serving as a data source for data binding to Extensible Markup Language (XML) content nodes.

25. The method of claim 1, wherein performing the operation, further comprises declaring an individual namespace within an Extensible Markup Language (XML) data source.

26. The method of claim 1, wherein performing the operation, further comprises managing a view of a data collection.

27. The method of claim 1, wherein performing the operation, further comprises handling a CurrentChanged event raised by collection views, or any class implementing the ICurrentItem interface.

28. The method of claim 1, wherein performing the operation, further comprises representing a method that handles a CurrentChanging event raised by collection view classes, or any class implementing the ICurrentItem interface.

29. The method of claim 1, wherein performing the operation, further comprises enabling notifications from at least one of the following: items within a collection have changed, an item has been added, removed, and the entire collection has been refreshed.

30. The method of claim 1, wherein performing the operation, further comprises creating collection view factory classes, which in turn create new CollectionView derived objects.

31. The method of claim 1, wherein performing the operation, further comprises, maintaining a concept of the current record pointer in a collection view.

32. The method of claim 1, wherein performing the operation, further comprises creating a One-Way Binding to a Dynamically Updated Data Source.

33. The method of claim 1, wherein performing the operation, further comprises describing a sort qualifier that is used to sort items in a collection when creating a view.

34. At least one computer-readable storage medium including computer-executable instructions for performing actions, comprising:
receiving at least one parameter; and
in response to receiving the at least one parameter,
performing an operation relating to a binding in an application on at least one property from at least one of: data sources, data source classes, and data-specific implementations of collections and views;
wherein the application comprises a user interface portion that includes user interface elements that each comprise one or more target properties and a logic portion that is configured to manipulate a source data value;
wherein the binding associates the one target property with the source data value;
wherein the binding is associated with a binding object that specifies binding properties comprising: a path indicating a manner to which to locate the source data value, a binding type comprising: a one way binding type that is used to update a non-editable property associated with the user interface; a two way binding type that is used to update an editable property associated with the user interface when the source data value changes and update the source data value when the editable property change; and an update type that specifies when updates are to occur.

35. The computer-readable storage medium of claim 34, wherein performing the operation, further comprises performing handling collection changed events in data collection underlying a collection view.

36. The computer-readable storage medium of claim 34, wherein performing the operation, further comprises performing a function relating to array list data collection.

37. The computer-readable storage medium of claim 36, wherein performing the function relating to the array list data collection, further comprises performing at least one of the functions within the set comprising: adding, clearing, creating a view, inserting, removing, reversing, setting a range, and sorting.

38. The computer-readable storage medium of claim 34, wherein performing the operation, further comprises managing bindings between a dynamic property user interface and a source data.

39. The computer-readable storage medium of claim 34, wherein performing the operation, further comprises getting the bind declaration object of a binding expression.

40. The computer-readable storage medium of claim 34, wherein performing the operation, further comprises performing a collection view function.

41. The computer-readable storage medium of claim 34, wherein performing the operation, further comprises implementing a collection view that includes checks for context infinity.

42. The computer-readable storage medium of claim 34, wherein performing the operation, further comprises supporting object references to objects being used as data context for a binding.

43. The computer-readable storage medium of claim 34, wherein performing the operation, further comprises encapsulating arguments for data transfer events, wherein the events are routed events that are handled by a designated handler based on a delegate.

44. The computer-readable storage medium of claim 34, wherein performing the operation, further comprises handling a data transfer event raised by a binding.

45. The computer-readable storage medium of claim 34, wherein performing the operation, further comprises representing an object reference to an element, with the object reference being specified by its element ID.

46. The computer-readable storage medium of claim 45, wherein the object reference is an explicit object reference.

47. The computer-readable storage medium of claim 34, wherein performing the operation, further comprises implementing a collection view for collections based on a list.

48. The computer-readable storage medium of claim 34, wherein performing the operation, further comprises serving as a data source for data binding.

49. The computer-readable storage medium of claim 34, wherein performing the operation, further comprises holding a collection of named parameters.

50. The computer-readable storage medium of claim 34, wherein performing the operation, further comprises representing a single select statement to be submitted to a database.

51. The computer-readable storage medium of claim 34, wherein performing the operation, further comprises encapsulating arguments passed in an event relating to at least one of an ObjectDataSource, and a RefreshCompleted event of an XmlDataSource.

52. The computer-readable storage medium of claim 34, wherein performing the operation, further comprises handling events relating to at least one of a ObjectDataSource.RefreshCompleted event and a XmlDataSource.RefreshCompleted event.

53. The computer-readable storage medium of claim 34, wherein performing the operation, further comprises receiving a list of sql commands and names of tables that they should be used to fill.

54. The computer-readable storage medium of claim 34, wherein performing the operation, further comprises getting data from a SQL Server for use in databinding.

55. The computer-readable storage medium of claim 34, wherein performing the operation, further comprises allowing resource reference to a transformer class that is defined as code-behind in a current application.

56. The computer-readable storage medium of claim 34, wherein performing the operation, further comprises declaring namespaces to be used in Xml data binding XPath queries.

57. The computer-readable storage medium of claim 34, wherein performing the operation, further comprises serving as a data source for data binding to Extensible Markup Language (XML) content nodes.

58. The computer-readable storage medium of claim 34, wherein performing the operation, further comprises declaring an individual namespace within an Extensible Markup Language (XML) data source.

59. The computer-readable storage medium of claim 34, wherein performing the operation, further comprises managing a view of a data collection.

60. The computer-readable storage medium of claim 34, wherein performing the operation, further comprises handling a CurrentChanged event raised by collection views, or any class implementing the ICurrentItem interface.

61. The computer-readable storage medium of claim 34, wherein performing the operation, further comprises representing a method that handles a CurrentChanging event raised by collection view classes, or any class implementing the ICurrentItem interface.

62. The computer-readable storage medium of claim 34, wherein performing the operation, further comprises enabling notifications from at least one of the following: items within a collection have changed, an item has been added, removed, and the entire collection has been refreshed.

63. The computer-readable storage medium of claim 34, wherein performing the operation, further comprises creating collection view factory classes, which in turn create new CollectionView derived objects.

64. The computer-readable storage medium of claim 34, wherein performing the operation, further comprises, maintaining a concept of the current record pointer in a collection view.

65. The computer-readable storage medium of claim 34, wherein performing the operation, further comprises creating a One-Way Binding to a Dynamically Updated Data Source.

66. The computer-readable storage medium of claim 34, wherein performing the operation, further comprises describing a sort qualifier that is used to sort items in a collection when creating a view.

* * * * *